(12) United States Patent
Paroha

(10) Patent No.: US 12,339,821 B2
(45) Date of Patent: Jun. 24, 2025

(54) MULTIPLE SOURCE DATA CHANGE JOURNAL SYSTEM

(71) Applicant: Schlumberger Technology Corporation, Sugar Land, TX (US)

(72) Inventor: Abhay Dutt Paroha, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 18/192,280

(22) Filed: Mar. 29, 2023

(65) Prior Publication Data

US 2023/0325369 A1 Oct. 12, 2023

Related U.S. Application Data

(60) Provisional application No. 63/326,164, filed on Mar. 31, 2022.

(51) Int. Cl.
*G06F 16/21* (2019.01)
*G01V 1/46* (2006.01)
*G06F 16/23* (2019.01)

(52) U.S. Cl.
CPC .......... *G06F 16/219* (2019.01); *G01V 1/46* (2013.01); *G06F 16/2358* (2019.01)

(58) Field of Classification Search
CPC .... G06F 16/219; G06F 16/21; G06F 16/9024; G06F 16/1873; G06F 16/282; G06F 16/2365; G06F 16/273

USPC ........................................... 707/695
See application file for complete search history.

(56) References Cited

U.S. PATENT DOCUMENTS

| | | |
|---|---|---|
| 2015/0112949 A1 | 4/2015 | Marland |
| 2017/0109096 A1 | 4/2017 | Jean et al. |
| 2017/0300552 A1* | 10/2017 | Mandadi ............. G06F 16/9024 |
| 2018/0320504 A1 | 11/2018 | Gunnerud et al. |
| 2019/0170898 A1 | 6/2019 | Contreras Otalvora et al. |
| 2021/0348490 A1 | 11/2021 | Wheatley et al. |

FOREIGN PATENT DOCUMENTS

CN 115455010 A * 12/2022 ......... G06F 16/2282

OTHER PUBLICATIONS

Cheng, Ren-hao, Dec. 9, 2022, CN 115455010 A "Data Processing Method Based On Milvus Database, Electronic Device And Storage Medium" (Year: 2022).*

Search Report and Written Opinion of International Patent Application No. PCT/US2023/016698 dated Jul. 20, 2023, 10 pages.

* cited by examiner

*Primary Examiner* — Shahid A Alam
(74) *Attorney, Agent, or Firm* — Jeffrey D. Frantz

(57) ABSTRACT

A method can include receiving data from a source; detecting a change in the data; generating an aggregate change journal based on the change; and providing access to information in the aggregate change journal by a computational framework that consumes the data in a time dependent manner.

19 Claims, 13 Drawing Sheets

Overlapping Physical Times in Requests

Aggregate Change Journal

Working buckets committed after time delay

Aggregate Change Journal Buckets Divided into 4 Slots

MULTIPLE SOURCE DATA CHANGE JOURNAL SYSTEM

CROSS-REFERENCE TO RELATED APPLICATION(S)

The subject disclosure claims priority from U.S. Provisional Appl. No. 63/326,164, filed on 31 Mar. 2022, herein incorporated by reference in its entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids.

SUMMARY

A method can include receiving data from a source; detecting a change in the data; generating an aggregate change journal based on the change; and providing access to information in the aggregate change journal by a computational framework that consumes the data in a time dependent manner. A system can include a processor; memory accessible to the processor; and processor-executable instructions stored in the memory to instruct the system to: receive data from a source; detect a change in the data; generate an aggregate change journal based on the change; and provide access to information in the aggregate change journal by a computational framework that consumes the data in a time dependent manner. One or more computer-readable storage media can include processor-executable instructions to instruct a computing system to: receive data from a source; detect a change in the data; generate an aggregate change journal based on the change; and provide access to information in the aggregate change journal by a computational framework that consumes the data in a time dependent manner. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
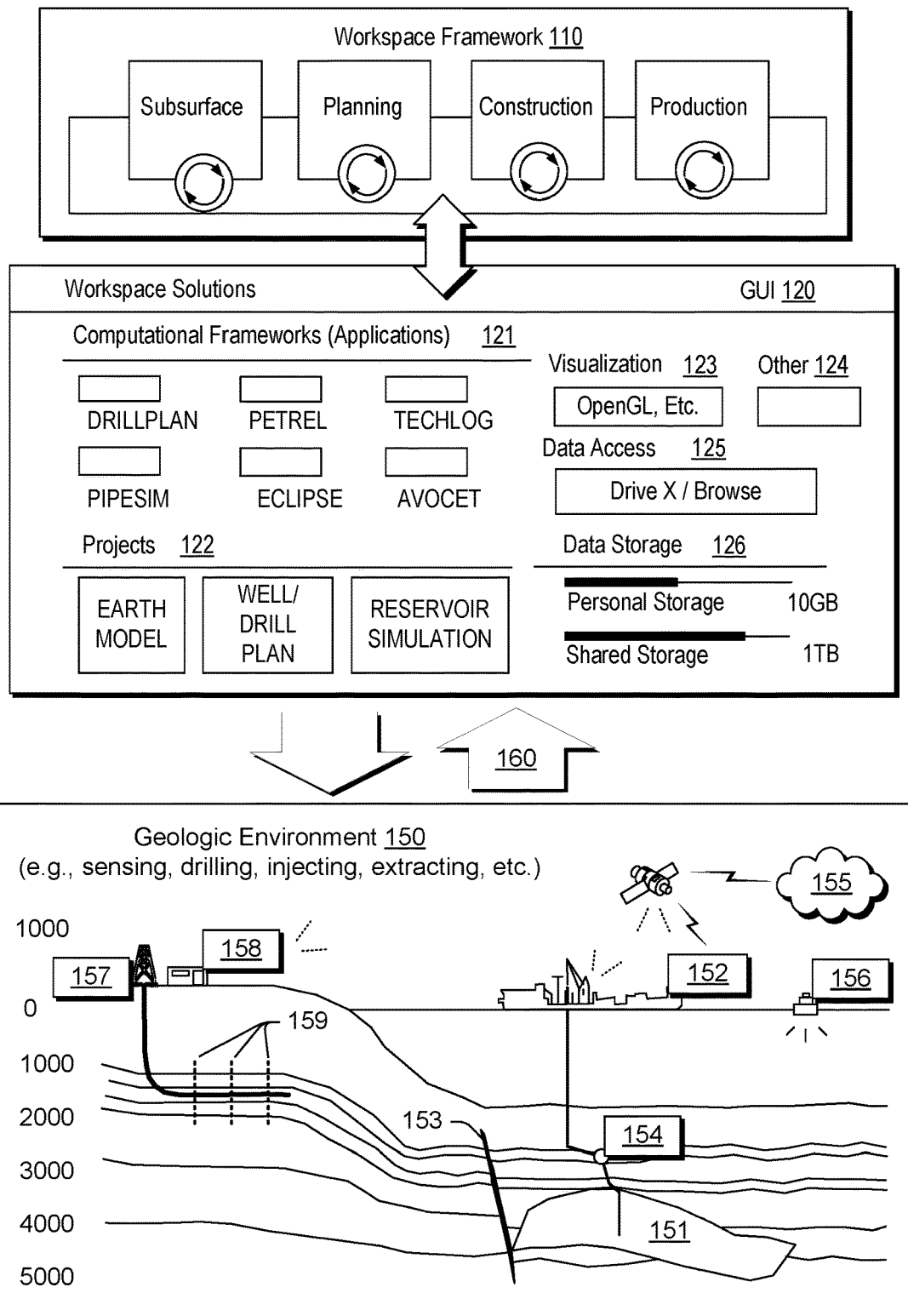
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and AVOCET frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (Schlumberger Limited, Houston, Texas, referred to as the DELFI environment) for utilization in geosciences and geoengineering, for example, to analyze subsurface data from exploration to production of fluid from a reservoir.

One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). As an example, such an environment can provide for operations that involve one or more frameworks. The DELFI environment may be referred to as the DELFI framework, which may be a framework of frameworks. As an example, the DELFI environment can include various other frameworks, which can include, for example, one or more types of models (e.g., simulation models, etc.).

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The ECLIPSE framework provides a reservoir simulator (e.g., as a computational framework) with numerical solutions for fast and accurate prediction of dynamic behavior for various types of reservoirs and development schemes.

Another reservoir simulation framework is the INTERSECT framework, which provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The AVOCET production operations framework includes features to help assess data. For example, the AVOCET framework provide for high-frequency real-time data storage and visualization to facilitate day-to-day production data management. The AVOCET framework is extensible and various packages can be added (e.g., model-based management to customize support for asset decision making, etc.). To further maximize production rates, recovery, safety, and efficiency, the AVOCET framework can utilize an asset optimization service that employs a holistic approach combining advanced technologies, domain expertise, etc. The AVOCET framework provides for analyzing historical and real-time data through the PRODCAST VX feature workflows (Schlumberger Limited, Houston, Texas), which can help to confirm measurement validity and, for example, reduce well test rejection rates. The AVOCET framework supports scalability for integration of high-quality measurements with production optimization workflows. For example, the AVOCET framework can collect, store and display various types of production operations information (e.g., surface data, wellbore data, wellhead data, facilities data, well test data, fluid analyses data, transfer tickets data, tank inventories data, etc.) to enable users to view and track forecasts, production targets, budgets, and other performance indicators at one or more levels. With cross-domain workflows and integration with one or more other frameworks, a user can understand and make decisions as to asset performance regardless of the asset type, size, or location.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. In such an approach, one or more features of a framework that may be available in one language may be accessed via a converter. For example, consider the APACHE SPARK framework that can include features available in a particular language where a converter may convert code in another language to that particular language such that one or more of the features can be utilized. As an example, a production field may include various types of equipment, be operable with various frameworks, etc., where one or more languages may be utilized. In such an example, a converter may provide for feature flexibility and/or compatibility.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where later acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different production scenarios to find an optimal one before production or further production occurs. A reservoir simulator will not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that result in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas) or the PETROMOD simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increase perforation efficiency and recovery.

As an example, the DELFI environment may implement the INNERLOGIX data engine (Schlumberger Limited, Houston, Texas). The INNERLOGIX data engine provide components for automated techniques to identify data issues and changes by applying user-defined assessment rules to an area of interest, to locate data changes or issues and automatically adjust and/synchronize data through a combination of techniques. Result can include results of automated assessment runs where adjusted and/or synchronized data can be displayed in GIS, chart, or spreadsheet form, and stored in a database. The INNERLOGIX data engine can provide a specialized set of rules that includes features such as a wellbore digital elevation checker, deviation survey outliner method, and log curve stratigraphic range verification; graphs, GIS, and reports to expose underlying data quality issues; a manual quality control tool for analyzing, comparing, and correcting data; and plug-and-play adapters for reading, inserting, and updating data from both PC and UNIX applications into common and proprietary data stores.

As an example, a data engine that can implement one or more machine learning models may be integrated with the INNERLOGIX data engine.

Figure 2:
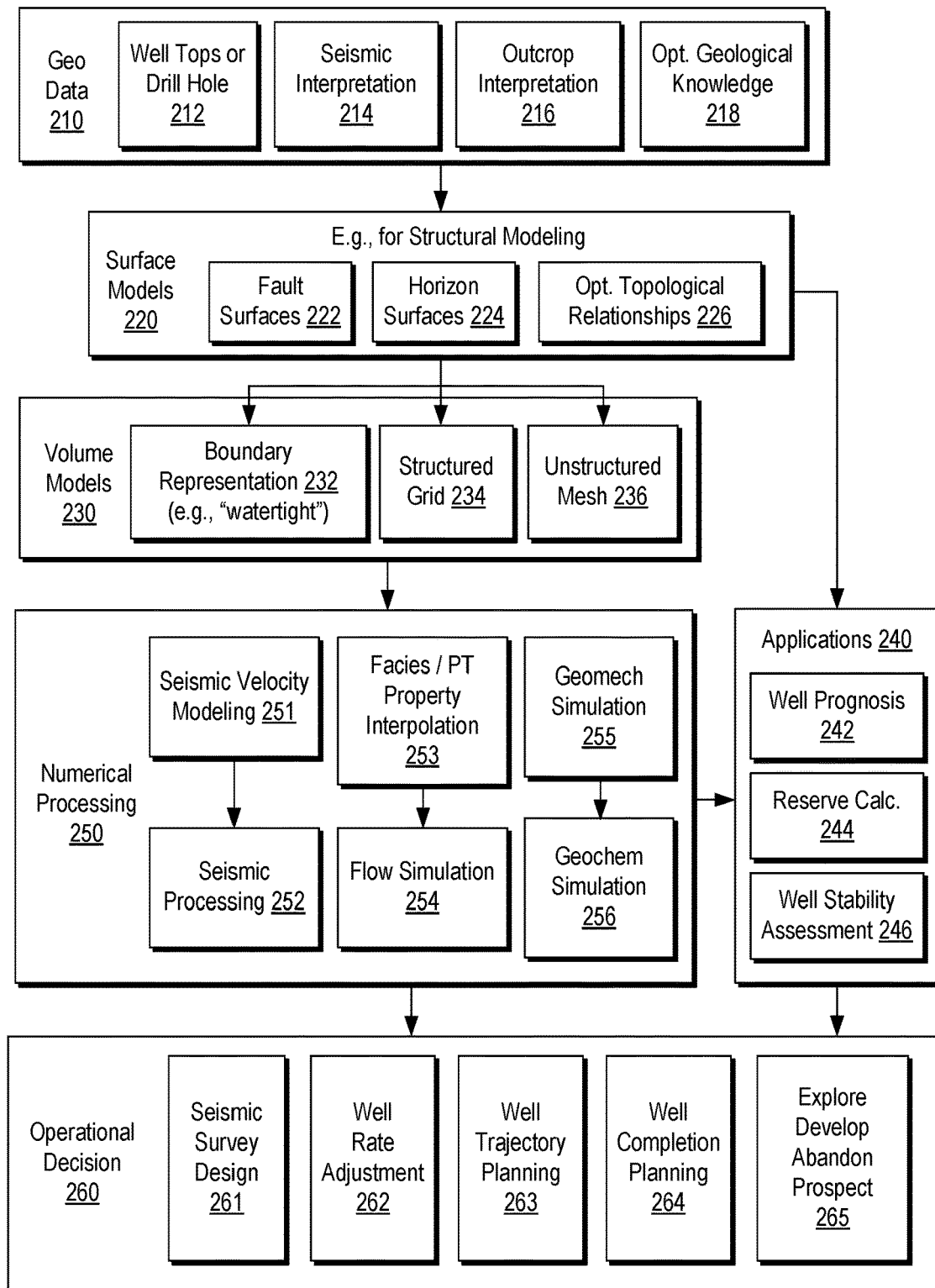
FIG. 2 illustrates an example of a system.

FIG. 2 shows an example of a system 200 that can be operatively coupled to one or more databases, data streams, etc. For example, one or more pieces of field equipment, laboratory equipment, computing equipment (e.g., local and/or remote), etc., can provide and/or generate data that may be utilized in the system 200.

As shown, the system 200 can include a geological/geophysical data block 210, a surface models block 220 (e.g., for one or more structural models), a volume models block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrophysical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 262, a well trajectory planning process 263, a well completion planning process 264 and a process for one or more prospects 265, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example, knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill-bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due to underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well completion planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

The system 200 can include and/or can be operatively coupled to a system such as the system 100 of FIG. 1. For example, the workspace framework 110 may provide for instantiation of, rendering of, interactions with, etc., the graphical user interface (GUI) 120 to perform one or more actions as to the system 200. In such an example, access may be provided to one or more frameworks (e.g., DRILLPLAN, PETREL, TECHLOG, PIPESIM, ECLIPSE, AVOCET, etc.). One or more frameworks may provide for geo data acquisition as in block 210, for structural modeling as in block 220, for volume modeling as in block 230, for running an application as in block 240, for numerical processing as in block 250, for operational decision making as in block 260, etc.

As an example, the system 200 may provide for monitoring data such as production data and/or production-related data. For example, consider the operational decision block 260 as including capabilities for monitoring, analyzing, etc., such data for purposes of making one or more operational decisions, which may include controlling equipment, revising operations, revising a plan, etc. In such an example, data may be fed into the system 200 at one or more points where the quality of the data may be of particular interest. For example, data quality may be characterized by one or more metrics where data quality may provide indications as to trust, probabilities, etc., which may be germane to operational decision making and/or other decision making.

Figure 3:
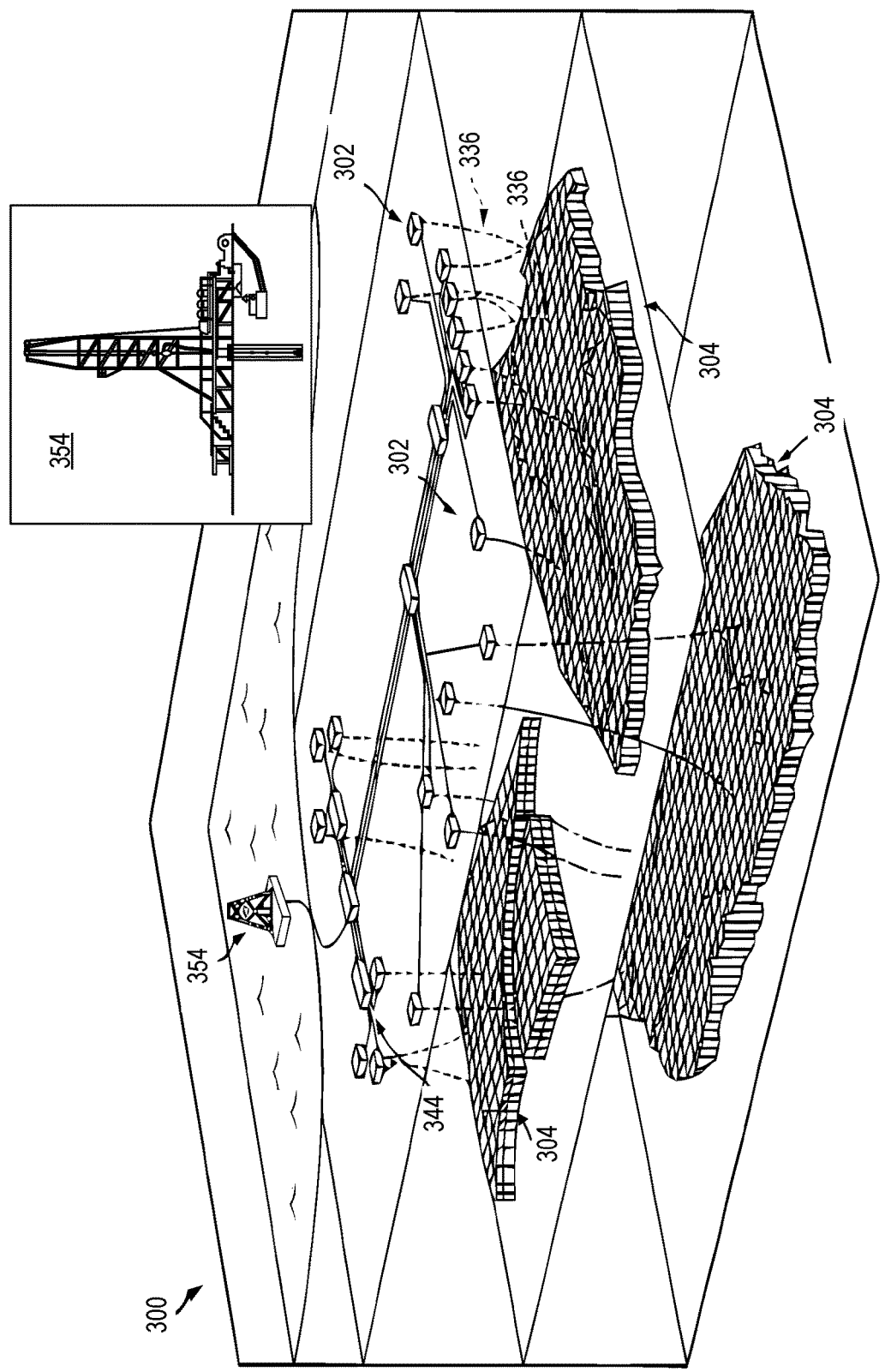
FIG. 3 illustrates an example of a geologic environment and examples of equipment.

FIG. 3 shows an example of a geologic environment 300 as including various types of equipment and features. As shown, the geologic environment 300 includes a plurality of wellsites 302, which may be operatively connected to a processing facility. In the example of FIG. 3, individual wellsites 302 can include equipment that can form individual wellbores 336. Such wellbores can extend through subterranean formations including one or more reservoirs 304. Such reservoirs 304 can include fluids, such as hydrocarbons. As an example, wellsites can provide for flow of fluid from one or more reservoirs and pass them to one or more processing facilities via one or more surface networks 344. As an example, a surface network can include tubing and control mechanisms for controlling flow of fluids from a wellsite to a processing facility. In the example of FIG. 3, a rig 354 is shown, which may be an offshore rig or an onshore rig. As an example, a rig can be utilized to drill a borehole that can be completed to be a wellbore where the wellbore can be in fluid communication with a reservoir such that fluid may be produced from the reservoir.

As mentioned, the geologic environment 300 can include various types of equipment and features. As an example, consider one or more sensors that can be located within the geologic environment 300 for purposes of sensing physical phenomena (e.g., pressure, temperature, flow rates, composition, density, viscosity, solids, flare character, compaction, etc.). As an example, equipment may include production equipment such as a choke valve where individual wells may each include a choke valve that can regulate flow of fluid from a well. As an example, equipment may include artificial lift equipment that can facilitate production of fluid from a reservoir. Artificial lift can be implemented as part of a production strategy whereby energy can be added to fluid to help initiate and/or improve production. Artificial lift equipment may utilize one or more of various operating principles, which can include, for example, rod pumping, gas lift, electric submersible pumps, etc. Referring again to FIG. 2, the operational decision block 260 may include planning for artificial lift, call for artificial lift, controlling one or more artificial lift operations, etc.

As an example, enhanced oil recovery (EOR) may be employed in the geologic environment 300, which may be based on one or more outputs of a system such as the system 200, the system 100, etc. EOR can aim to alter fluid properties, particularly properties of hydrocarbons. As an example, EOR may aim to restore formation pressure and/or improve oil displacement or fluid flow in a reservoir. EOR may include chemical flooding (e.g., alkaline flooding or micellar-polymer flooding), miscible displacement (e.g., carbon dioxide injection or hydrocarbon injection), thermal recovery (e.g., steam flood or in-situ combustion), etc. EOR may depend on factors such as reservoir temperature, pressure, depth, net pay, permeability, residual oil and water saturations, porosity and fluid properties such as oil API gravity and viscosity. Enhanced oil recovery may be referred to at times as improved oil recovery or tertiary recovery.

Figure 4:
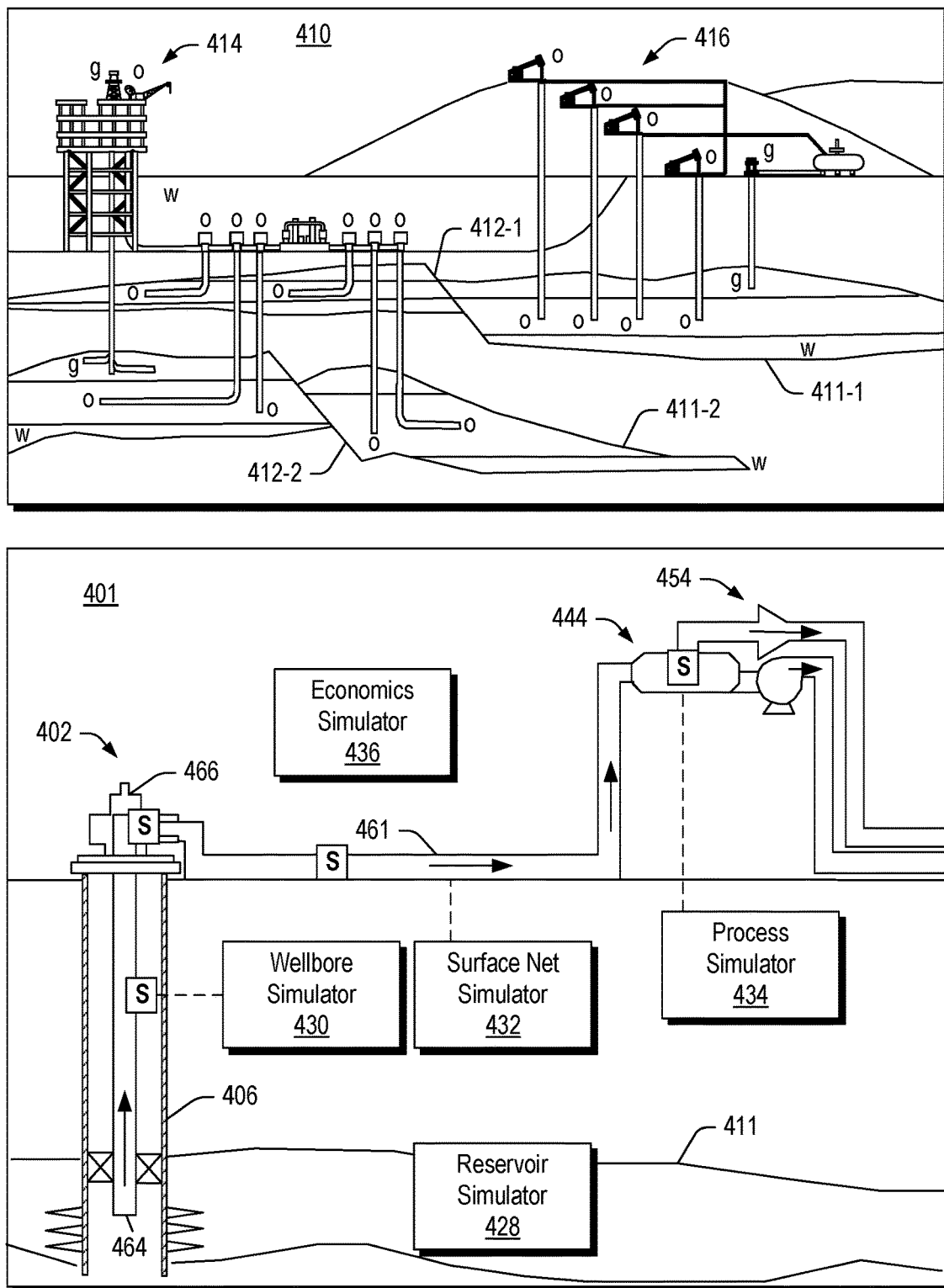
FIG. 4 illustrates examples of equipment and examples of simulators.

FIG. 4 shows an example of a portion of a geologic environment 401 and an example of a larger portion of a geologic environment 410. As shown, a geologic environment 410 can include one or more reservoirs 411-1 and 411-2, which may be faulted by faults 412-1 and 412-2 and which may include oil (o), gas (g) and/or water (w). FIG. 4 also shows some examples of offshore equipment 414 for oil and gas operations related to the reservoirs 411-1 and 411-2 and onshore equipment 416 for oil and gas operations related to the reservoir 411-1. As an example, a system may be implemented for operations associated with one or more of such reservoirs.

As to the geologic environment 401, FIG. 4 shows a schematic view where the geologic environment 401 can include various types of equipment. As shown in FIG. 4, the environment 401 can includes a wellsite 402 and a fluid network 444. In the example of FIG. 4, the wellsite 402 includes a wellbore 406 extending into earth as completed and prepared for production of fluid from a reservoir 411 (e.g., one of the reservoirs 411-1 or 411-2).

In the example of FIG. 4, wellbore production equipment 464 extends from a wellhead 466 of the wellsite 402 and to the reservoir 411 to draw fluid to the surface. As shown, the wellsite 402 is operatively connected to the fluid network 444 via a transport line 461. As indicated by various arrows, fluid can flow from the reservoir 411, through the wellbore 406 and onto the fluid network 444. Fluid can then flow from the fluid network 444, for example, to one or more fluid processing facilities 454.

In the example of FIG. 4, sensors (S) are located, for example, to monitor various parameters during operations. The sensors (S) may measure, for example, pressure, temperature, flowrate, composition, and other parameters of the reservoir, wellbore, gathering network, process facilities and/or other portions of an operation. As an example, the sensors (S) may be operatively connected to a surface unit (e.g., to instruct the sensors to acquire data, to collect data from the sensors, etc.).

In the example of FIG. 4, a surface unit can include computer facilities, such as a memory device, a controller, one or more processors, and display unit (e.g., for managing data, visualizing results of an analysis, etc.). As an example, data may be collected in the memory device and processed by the processor(s) (e.g., for analysis, etc.). As an example, data may be collected from the sensors (S) and/or by one or more other sources. For example, data may be supplemented by historical data collected from other operations, user inputs, etc. As an example, analyzed data may be used in a decision-making process.

As an example, a transceiver may be provided to allow communications between a surface unit and one or more pieces of equipment in the environment 401. For example, a controller may be used to actuate mechanisms in the environment 401 via the transceiver, optionally based on one or more decisions of a decision-making process. In such a manner, equipment in the environment 401 may be selectively adjusted based at least in part on collected data. Such adjustments may be made, for example, automatically based on computer protocol, manually by an operator or both. As an example, one or more well plans may be adjusted (e.g., to select optimum operating conditions, to avoid problems, etc.).

To facilitate data analyses, one or more simulators may be implemented (e.g., optionally via the surface unit or other unit, system, etc.). As an example, data fed into one or more simulators may be historical data, real time data or combinations thereof. As an example, simulation through one or more simulators may be repeated or adjusted based on the data received.

In the example of FIG. 4, simulators can include a reservoir simulator 428, a wellbore simulator 430, a surface network simulator 432, a process simulator 434 and an economics simulator 436. As an example, the reservoir simulator 428 may be configured to solve for hydrocarbon flow rate through a reservoir and into one or more wellbores. As an example, the wellbore simulator 430 and surface network simulator 432 may be configured to solve for hydrocarbon flow rate through a wellbore and a surface gathering network of pipelines. As to the process simulator 434, it may be configured to model a processing plant where fluid containing hydrocarbons is separated into its constituent components (e.g., methane, ethane, propane, etc.), for example, and prepared for further distribution (e.g., transport via road, rail, pipe, etc.) and optionally sale. As an example, the economics simulator 436 may be configured to model costs associated with at least part of an operation. For example, consider MERAK framework (Schlumberger Limited, Houston, Texas), which may provide for economic analyses.

As an example, a system can include and/or be operatively coupled to one or more of the simulators 428, 430, 432, 434 and 436 of FIG. 4. As an example, such simulators may be associated with frameworks and/or may be considered tools (see, e.g., the system 100 of FIG. 1, etc.). Various pieces of equipment in the example geologic environments 401 and 410 of FIG. 4 may be operatively coupled to one or more systems, one or more frameworks, etc. As an example, one or more of the sensors (S) may be operatively coupled to one or more networks (e.g., wired and/or wireless) for transmission of data, which, as explained, may include data indicative of production. As shown, a sensor (S) may be utilized for acquisition of downhole data and/or surface data, which can include data relevant to production (e.g., flow rate, temperature, pressure, composition, etc.). Such data may be utilized in a system such as, for example, the system 200 of FIG. 2 for operational decision making, etc.

As explained, various workflows can be performed on data and/or using data. For example, consider a production workflow that can be implemented for one or more aspects of production operations. In such an example, a framework such as the AVOCET framework may be utilized, optionally in combination with one or more other frameworks (e.g., TECHLOG, ECLIPSE, PIPESIM, INTERSECT, etc.). A production workflow may aim to determine an amount or rate of fluid being produced from one or more wells in a field or fields. In such an example, each well can generate data such as a time series data stream of one or more production related values. In such an example, the values may be sensor values from one or more sensors. As explained, sensors may be for flow rates, pressures, temperatures, etc. As an example, equipment conditions may be represented as values such as, for example, a percentage value as to a valve in a production system being open or closed (e.g., 0 percent open or 100 percent open).

As an example, a system can include a production workflow engine (PWE) that can be a hierarchical computational engine. For example, consider a hierarchy structured as a tree with branches and leaves where data sources, data flows, data computations, etc., can be represented.

Figure 5:
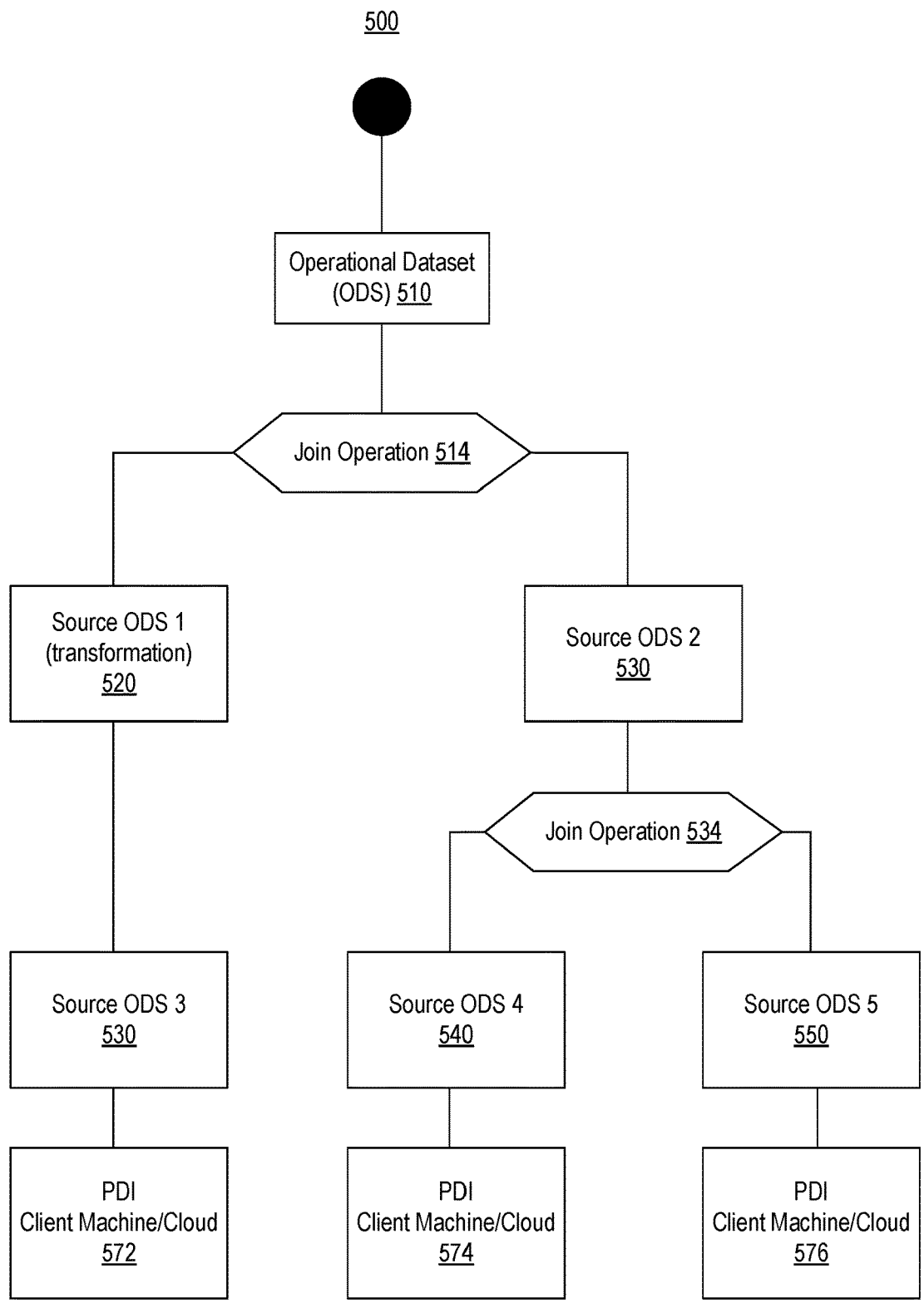
FIG. 5 illustrates an example of a structure with respect to data sources and operations.

FIG. 5 shows an example of a PWE structure 500, which may be traversed from top to bottom or bottom to top, depending on task, perspective, definition, etc. As shown, the structure 500 includes an operational dataset (ODS) 510 that can be a result of various operations, including a join operation 514 that joins information from multiple branches. As shown, the join operation 514 can join information from a source ODS 1 (e.g., transformation) block 520 and from a source ODS 2 block 530, which is a result of another join operation 534 referencing a source ODS 4 block 540 and a source ODS 5 block 550. As to the source ODS 1 block 520, it can reference a source ODS 3 block 530. At the lowest level of the structure 500 are various PDI blocks 572, 574 and 576, which can correspond to various sources of data that may be stored or otherwise available via a client machine, a cloud resource, etc.

In the example of FIG. 5, the structure 500 can be part of a workflow where, for example, a call is made for the operational dataset of the block 510 and various operations are performed according to the defined hierarchy to provide that operational dataset (ODS). As an example, the structure 500 may be called as part of a production workflow such as, for example, an AVOCET framework production workflow. The structure 500 of FIG. 5 pertains to a particular hierarchy noting that a variety of hierarchies can exist for a variety of workflows, workflow tasks, etc.

As an example, the structure 500 may be for an oil production target workflow such that the leaves of the structure 500, the blocks 572, 574 and 576 represent the data sources that are to be accessed for purposes of performing the oil production target workflow. As explained, data sources can be sources of time series data that may, for example, be generated at one or more wellsites, surface equipment locations, etc. As explained, a production network can fluidly link a number of wells and collect fluids for processing at a common production facility (e.g., a processing facility, etc.). The PIPESIM framework can provide for computations and results for a production network that provides for transportation of fluids from a reservoir or reservoirs to a processing facility or processing facilities. Such a framework may provide for optimization of flow to meet one or more production targets. Such a framework can provide for analysis of individual wells to vast production networks where single and multiphase flow simulation features help to optimize production. As explained with respect to the examples of FIG. 4, various types of data, frameworks, etc., can be involved in a production workflow.

As an example, a PWE can implement a bi-temporal append-only data model. One of the promises of such a model is the ability to aggressively cache results throughout a data flow path. As any datum may be identified by physical and version time, it can be cached forever if desired. This characteristic can be applied at each level of a hierarchical computation structure (e.g., tree, etc.), as long as the computations (e.g., numerical operations, etc.) are clean (e.g., free of side effects) and reproducible. There is, however, a performance-sapping problem: while cached results can be freely reused for the same physical and version time combination, the problem remains to determine if a cached result for a given version time can be reused for later version times. That is, for a given physical time, if a cached datum at version N is available, is it safe to satisfy requests at versions N+1, etc., with this cached value? A naïve implementation involves flowing such a validity check down a structure, thus generating an increasing number of requests that arrive at the data source(s) within a short period of time. This is neither desirable from the perspective of wasted effort in infrequently changing data and in load patterns at the data source (e.g., high request amplification, with near-simultaneous delivery). As an example, a system can include features to mitigate the aforementioned problem without introduction of a new "chatty" synchronization mechanism.

As an example, consider a production workflow that involves a user at a workstation executing a production operations framework where data, values, graphics, etc., are expected to be updated on a relatively frequent basis. For example, consider updates according to an interval such as an interval within a range from approximately one minute to 20 minutes. As an example, consider a 5-minute update interval where a framework calls for requests with a version time that is in the past every 5 minutes and where, in response, the framework renders updated results to a display (e.g., via a graphical user interface).

Figure 6:
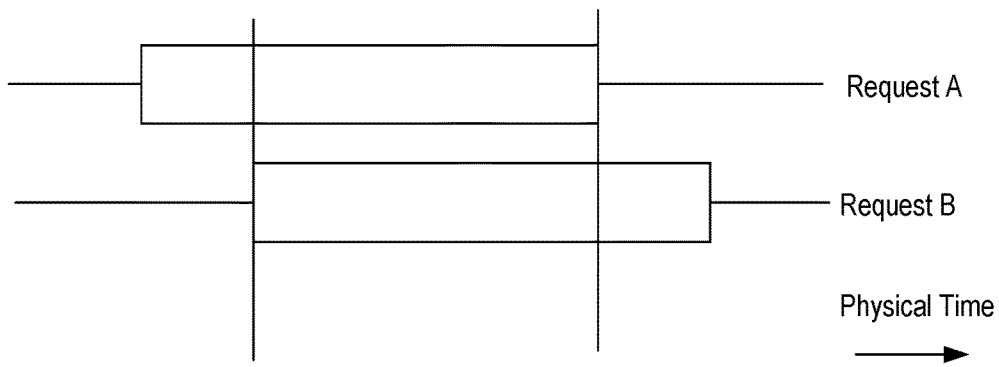
FIG. 6 illustrates examples of graphics of data structures.
Figure 6:
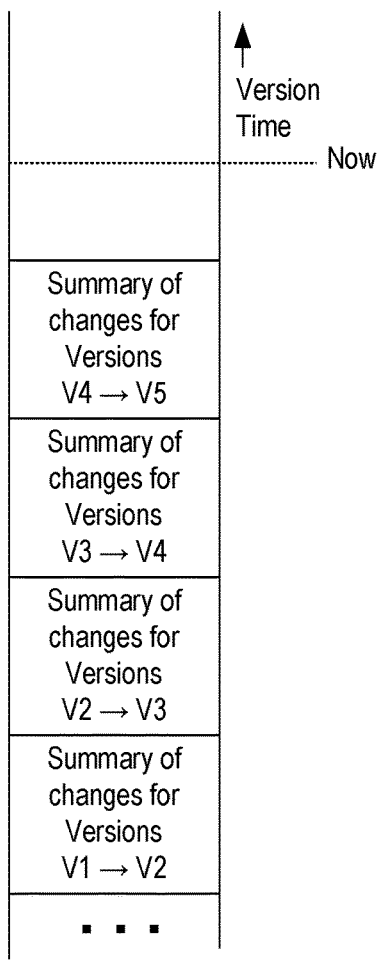
Figure 6:
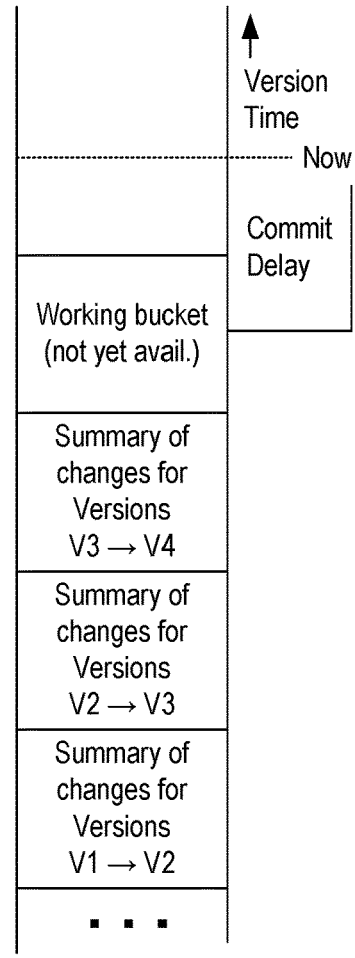

FIG. 6 shows various example graphics 610, 620 and 630. As to the graphic 610, it shows two requests A and B with respect to physical time where the physical times overlap for windows of data associated with each of the two requests A and B. As an example, a client application may tend to make the same requests at increasing points in time. So, for example, a request could be to fetch the values for the "pressure" ODS for specific keys, given a time range of the last 24 hours at the current (e.g., give or take an offset as discussed) version time.

In FIG. 6, if the version times were the same, it would be possible to reuse the overlapping physical time results from the request A in the response to the request B, thus only leaving the incremental physical time segment to be requested. Unfortunately, the version times are rarely the same, which leads to the recurring question: "given the version times of the request A and the request B, has any data changed during the physical time range of the overlap?" Similarly, the incremental section of physical time in the request B will cause the underlying data to be fetched, even if there are no new data points. As an example, a system can provide for a reduction in the number of times a workflow engine has to make calls to find out if cached data is still valid and whether new data is available. For example, such a system can provide a way to reduce the number of application programming interface (API) calls that have to be made.

It is worth noting that making calls to check whether there are new data, or enhancing an underlying API to conditionally return data, still demand the same number of API calls. As the time slices of these increments tend to be relatively small, their cost can be overwhelming in terms of networking cost: the very fact that such requests are made is costly.

In FIG. 6, the graphic 620 pertains to use of a shared append-only data structure, which can be an aggregate change journal data structure. In such an example, for each data source (e.g., production data integration (PDI) source), a system can perform relatively simple accounting of changes during time intervals. For sake of simplicity, assume that the time interval is fixed and that a system is tracking changes to data within a PDI source.

In the example of FIG. 6, the aggregate change journal is append-only and each "bucket", which includes a summary of changes between two versions of the data, is immutable once committed. Such an approach allows the data structure to be propagated throughout a system with relative ease. For example, consider a summary of changes within each bucket in the data structure as including: (i) the oldest physical time affected by changes within the version time range of the bucket; (ii) the newest physical time affected by changes within the version time range of the bucket; (iii) the oldest physical time affected by changes at any version prior to the end of the bucket; and (iv) the newest physical time affected by changes at any version prior to the end of the bucket. In such an approach, the summary describes the physical time range where incremental data was introduced during the version range and the complete physical time range containing data at the latest version.

As to how a system can utilize an aggregate change journal, consider the following two caching problems to be solved in a workflow engine: (i) given a physical time range T1→T2 (the cached overlapping data) and version V1 (the version it was cached for), is data for this time range unchanged in version V2?; and (ii) given a physical time range T1→T2 (a time range for which no data are cached for) and a version V, are any data available?

As to the first question, to find out if the cached data block can be used, the data structure can be scanned for buckets including the V1→V2 version range. If the minimum of the oldest physical times in those buckets is less than T2, then the cached data cannot be used. And, if the complete set of buckets for the version time range cannot be retrieved, the cached data cannot be used. However, if neither of the above is true, then the cached data can be used as-is.

As to the second question, if the T1→T2 physical time range intersects with the complete time range for the bucket including version V, then there are data available (e.g., that can be queried). And, if there is no intersection, then the workflow engine can safely assume that there are no data for the range specified.

As to generation of an aggregate change journal, consider an example with steady state operation. For steady state operation, it can be possible to generate incremental buckets in the data structure with simple knowledge of the last bucket's summary and physical time information about an incoming data stream. As the incoming data may be delayed, the summary contents of buckets are only committed after the fact. In other words, buckets can only be committed once a certain delay from real-time has passed.

In FIG. 6, the graphic 630 illustrates a commit delay, which can be a certain delay as measured from real-time. As explained, a bucket can only be committed once a certain delay from real-time has passed (e.g., summary contents of a bucket are committed after the fact). As shown in the graphic 630, the most recent working bucket is not yet available due to the commit delay with respect to current time ("now").

As to an initial bucket, if there are no prior buckets in the data structure and the time series data are present, an initial bucket can be created for the period leading up to the current working bucket. In such an example, the summary in the initial bucket can include the minimum and maximum physical times up to the initial version.

As to a catch-up after outage operation, in the case where an outage has prevented one or more buckets from being committed, one or more subsequent buckets can include catch-up information to ensure that the data structure, even with one or more missing buckets, is useful for its intended purpose.

As an example, one or more outage features of a system can include one or more of replaying the missing changes for the intervening buckets; and constructing a new initial bucket and starting a data structure anew.

As an example, a system can include features for dividing a bucket. In such an example, dividing a bucket can address instances where one summary for the time series in a (even single-asset) deployment is too coarse. For example, different time series can have different cadences and the accumulated time range can cease to be particularly useful when time series with different temporal locality (e.g., measured vs. forecast data, etc.) are combined.

Dividing a bucket (e.g., bucket division) can be characterized by limits or extremes. For example, an extreme approach may divide the buckets into "slots" as summaries per individual time series, which would provide great locality, but would become increasingly impractical as the number of time series (e.g., consider over 100,000 time series) increases.

As an example, a system can include a mapping function from time series to slot in each bucket. Such a mapping function can be private where a workflow engine can be free of its own parallel implementation. In an effort to reduce demands of sharing such implementation details, a PDI source may have an implementation of its choosing and communicate the time-series-to-slot mapping as part of time series metadata. Noting that, even absent a time series metadata API, a slot number can be communicated as part of regular time series responses.

Figure 7:
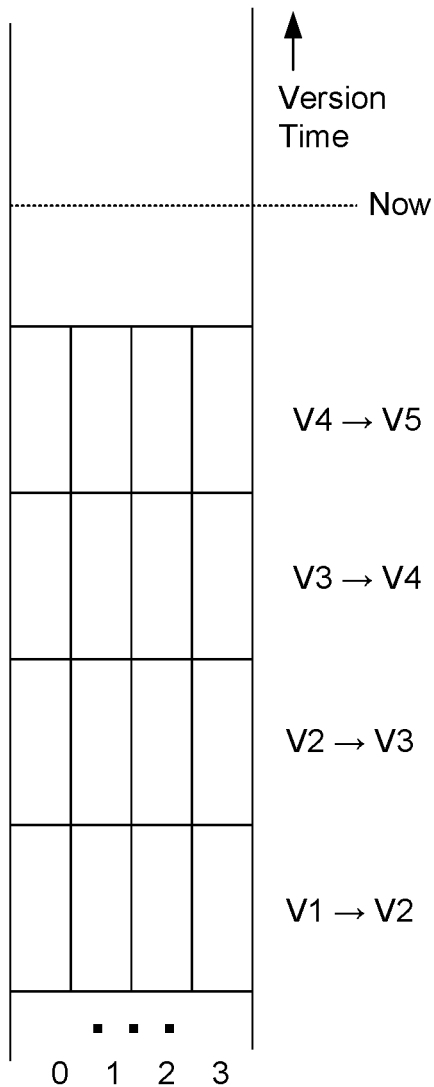
FIG. 7 illustrates an example of a graphic of a data structure.

FIG. 7 shows an example graphic 700 where buckets as in the graphic 620 of FIG. 6 are shown as being divided into a number of slots. In the example of FIG. 7, each of the buckets is divided in four slots; noting that no slots of a different number of slots may be utilized.

As an example, a system may assist with choosing an appropriate mapping function and picking the appropriate version time interval for buckets, which may be part of a tuning process for a data structure. As an example, a system may commence with relatively and deliberately simple choices and then proceed to more advanced choices as part of a tuning process.

As explained, a system can utilize one or more call mechanisms such as, for example, API call mechanisms. As an example, consider a set of APIs that can propagate a data structure. In such an example, such APIs can allow a data structure to be propagated from a PDI source to a workflow engine.

As to a pull approach, consider an on-demand pull API. In such an example, various workflow engine components can call an on-demand API to get the contents of one or more buckets relevant to a version range. Noting that in such an example, the starting and ending version times do not necessarily have to be aligned with a particular interval.

As an example, a system can utilize one or more push APIs. For example, consider an ability to publish incremental buckets.

As an example, a set of APIs can include a time series query API, for example, to introspect time series metadata. In such an example, a time series query API can include a field as part of a time series API response "slotIndex", which can be a non-negative integer that serves as the index into aggregate change journal bucket slots for this time series.

As an example, consider the following "slotindex" response field as part of a time series API response:

```
{
"slotIndex": 14,
"values": [
    {
    "boundaries": [
        1262304000000,
        1262390400000,
        1262476800000,
        1262563200000,
        1262649600000,
        1262736000000,
        1262822400000,
        1262908800000,
        1262995200000,
        1263081600000,
    ]
    ,
    "values": [
        1.4158425000000001,
        1.44415935,
        1.4724762,
        1.50079305,
        1.5291099000000001,
        1.55742675,
        1.5857436,
        1.61406045,
        1.6423773000000002
    ]
    }
]
}
```

As an example, a system can provide for change notification for high and low frequency data. For example, consider such a system as being utilized in one or more types of workflows (e.g., production operations, well operations, data integration, shared services, etc.).

As an example, production data integration (PDI) system can follow a combination of microservices and agent-based architecture to enable desirable functional and non-functional characteristics.

As an example, a PDI agent can be an autonomous system agent and a type of software agent that can be executed using on-premise resource(s) to support real-time data delivery to a cloud platform. In such an example, the agent can be a computer program with instructions stored in memory that can be executed to work towards one or more goals in a dynamic environment on behalf of another entity (human or computational), optionally over an extended period of time, without continuous direct supervision or control. In such an example, an agent may include features that allow it to exhibit substantial flexibility.

As an example, an agent can be utilized for real-time data ingestion. For example, consider a real time data feed as a "stream" for PDI, where each stream includes timestamped values and quality attributes. As an example, a stream may be generated by one or more measurement devices in the field (e.g., flow meters, pressure sensors, etc.) and may be operating at a relatively high frequency (1-5 seconds per record). As an example, a stream may be a result of calculation/aggregation on a raw stream and thus represent derived values.

As an example, a system can include an architecture to support capturing data from thousands of such streams and securely storing data received through such streams for various consumers. As to an arrangement of components in such an architecture, consider agent components and ingestion endpoint components.

As an example, a system can provide for interactions with PDI sources for ingestion of on-premise data via one or more agents for storing of such data to one or more resources of a cloud platform such that the data are available through a set of APIs to one or more other applications (e.g., frameworks, etc.). As explained, a production operations framework may employ a production workflow engine (PWE) that consumes data for one or more purposes.

As explained, a PWE can be a hierarchical computation engine where calculation tree leaves are bound to data sources (e.g., PDI sources). As explained, a PWE can implement a bi-temporal (e.g., physical time and version time) append only data model and can cache results throughout a data flow path or paths. This property can apply at each level of a hierarchical structure where computations (e.g., operations) are clean (e.g., free of side effects) and reproducible.

As explained, a problem can be cast as whether or not a PWE cached result for a given version time (N) can be reused for later version times (N+1), etc. As explained, an assumption can be that PWE clients are regularly making requests with a version time in the past. As explained, a framework may automatically issue requests according to an interval of time.

As explained, a naïve implementation involves validity checking down a PWE structure, which will generate an increasing number of requests that arrive at a data source(s) (PDI source(s)) within a relatively short period of time, which tends to be undesirable from the perspective of wasted effort in infrequently changing data and in load patterns at the data source.

As an example, a system can provide for a reduction in "chattiness" between PDI source(s) and a PWE, which may be cast via several questions, as explained (e.g., given a physical time range T1→T2 (the cached overlapping data) and version V1 (the version it was cached for), is data for this time range unchanged in version V2? and given a physical time range T1→T2 (a time range no data are cached for) and a version V, is any data available?).

As explained, a PWE client (e.g., a framework, etc.) may tend to make the same requests at increasing points in time. For example, consider a request for pressure data for a specific well (e.g., per a well ID), given a time range of the last 24 hours at the current version time. As explained, if the version times are the same, it may be possible to reuse the overlapping physical time results from a request A in the response to a request B, thus only leaving the incremental physical time segment to be requested even if there are no new data points. However, as mentioned, version times are rarely the same, which leads to the recurring question: "given the version times of a request A and a request B, has any data changed during the physical time range of the overlap?"

As explained, various issues can be addressed through use of an aggregate change journal append-only data structure which has a collection of immutable buckets. In such an example, each bucket can include a summary of changes between two versions of the data (e.g., the oldest physical time affected by changes within the version time range of the bucket, the newest physical time affected by changes within the version time range of the bucket, the oldest physical time affected by changes at any version prior to the end of the bucket, and the newest physical time affected by changes at any version prior to the end of the bucket).

In various instances, there is some possibility that an on-premise data source has different frequencies of time series data, which may be categorized as high frequency and low frequency (e.g., one time series of data being acquired and/or transmitted more frequently than another time series of data). In such an example, a system may group data based on frequency. For example, consider use of a grouping hash function to group data in a slot in single bucket.

Figure 8:
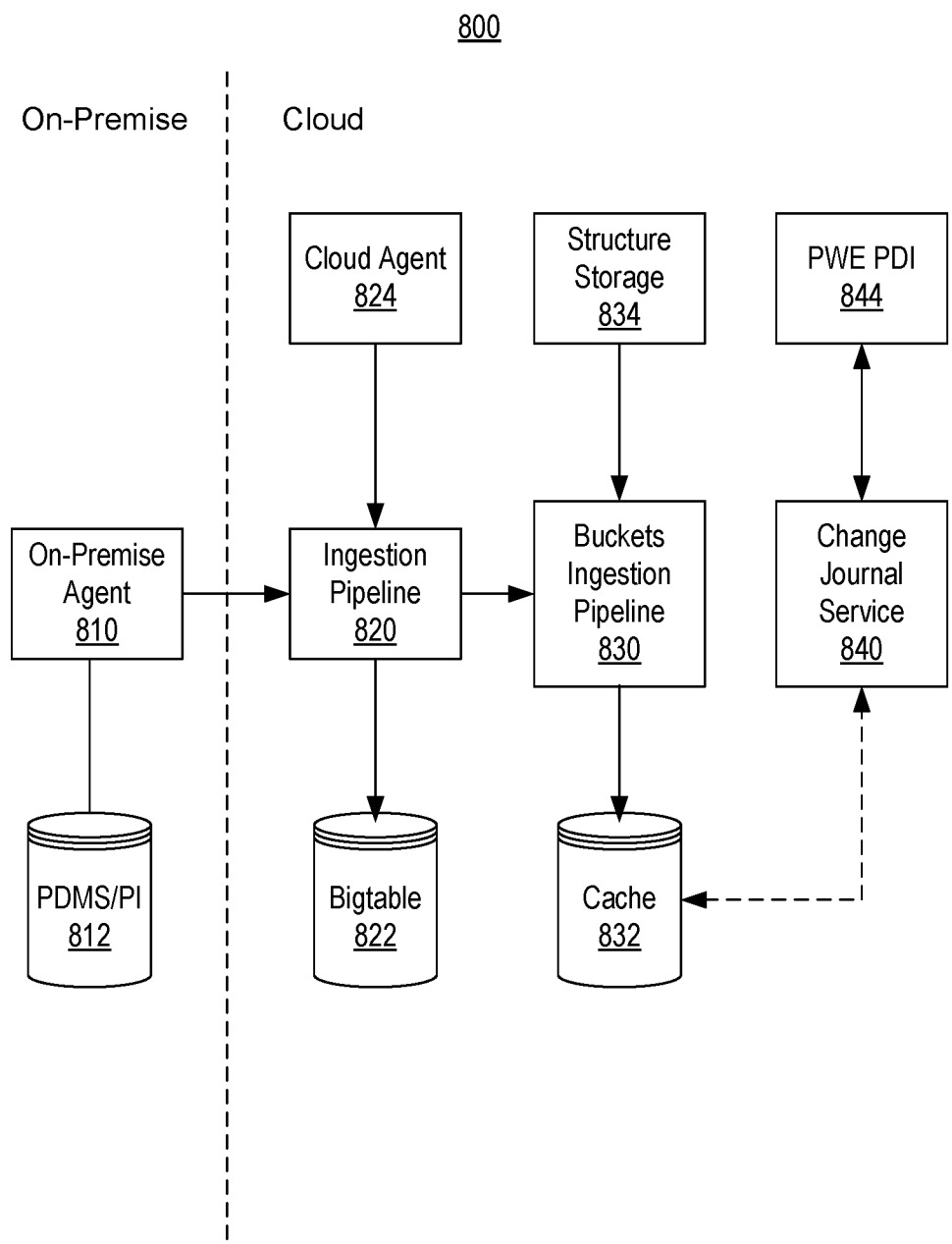
FIG. 8 illustrates an example of a system.

FIG. 8 shows an example of a system 800 with various components, including an on-premise agent 810, a production data management system (PDMS/PI) 812 as an on-premise data source (e.g., or data sources), an ingestion pipeline 820 operatively coupled to a table structure 822 (e.g., cloud platform based storage resources) and a cloud platform agent 824 (e.g., a cloud platform based data source or sources), a buckets ingestion pipeline 830 operatively coupled to a cache 832 and a structure storage 834 and a change journal service 840 operatively coupled to a production workflow engine and production data integration (PWE PDI) component 844 and operatively coupled to the cache 832. In such an example, the component 844 can issue signals to the change journal service 840 such that calls can be made that result in information being pulled from the cache 832, as managed by the buckets ingestion pipeline 830. As explained, the cache 832 can include bucket related information as to changes, which may be based on whether or not one or more changes have occurred within a certain interval of time.

As an example, the system 800 can be referred to as a multiple source data change journal system. Such a system can operate in combination with one or more frameworks that can depend on data and consume data in a time dependent manner. For example, a framework may periodically call such a system to determine whether a change has or changes have occurred and, in response, the framework may consume the data to generate one or more results. As explained, an API call may be utilized that accesses a cache of change information where the API call may specify one or more times and where, in response, one or more indications of a change or changes can be returned. In such an approach, the framework operates in a time dependent manner where a time or times can be utilized to determine whether data are available or not for consumption by the framework.

In the example of FIG. 8, consider a production operations workflow being executed by a framework such as the AVOCET framework, which may be represented by the component 844, where a signal is sent at 5-minute intervals to the change journal service 840. For example, consider a call that specifies two times, T1 and T2, where the call is to get one bucket between the times T1 and T2. In such an example, T1 can be an old time and T2 can be a new time (e.g., it may be a near real-time). Such an approach can be cast as a query, for example, what has changed in the last 5 minutes? The answer to such a question may be that nothing has changed or that something has changed. If nothing has changed, then there may be no reason to update an assessment of the framework (e.g., no new data, etc.); whereas, if something has changed, then data can be accessed and processed (e.g., according to a production workflow, etc.). In the example of FIG. 8, the new time may depend on one or more settings. For example, consider a new time that is limited to be within the past 30 days. In such an example, a user may utilize a framework to assess data that is not necessarily as fresh as 5 minutes. Such a limit may be referred to as a 30-day lookback window; noting that a value other than 30 days may be utilized.

In the example of FIG. 8, while a pull approach is mentioned, as an example, a push approach may be implemented. For example, consider a push approach where push is automated by the change journal service 840 and/or by the cache 832 (e.g., or feature associated with the cache 832) to push information associated with a bucket or buckets to the PWE PDI component 844.

In the example of FIG. 8, the on-premise agent 810 can be a software agent to fetch data from the on-premise data source 812, a data transformation, etc., to store data to a cloud platform resource such as, for example, the table 822 (e.g., via the ingestion pipeline 820).

As to the ingestion pipeline 820, it can subscribe to data events from the on-premise agent 810 and transform it for purposes of storage of information in the table 822. The ingestion pipeline 820 can also publish an event that results in building an aggregate change journal and storing information in the cache 832 via the buckets ingestion pipeline 830.

As an example, one or more communications can include one or more of: DataPointsAddedMessage—<StreamData>; StreamData—streamId, physicalTime, versionTime; BucketMessage—startVt, endVt, current, <Slot>; Slot—index, minPt, maxPt, aggMinPt, aggMaxPt, streamIds. In such an example, one or more message brokers may be utilized for appropriate communications.

As to the buckets ingestion pipeline 830, it can subscribe to events from the ingestion pipeline 820 and the structure storage 834 and create aggregate change journal structures (e.g., bucket information) and cache them to the cache 832. As an example, the structure storage 834 can include information as to various structures (e.g., equipment, etc.) at a site or sites. For example, consider types of sensors, etc., where each of the sensors may generate data such as time series data, etc.

As explained, the change journal service 840 can provide a set of APIs to expose information for an aggregate change journal to the PWE PDI component 844. In such an example, a PWE can utilize one or more of the APIs to update its own, local cache. For example, an API call or APIs calls may originate with the PWE PDI component 844 and/or the change journal service 840 to result in transmission of appropriate information from the cache 832.

As an example, the on-premise agent 810 may be for onsite equipment, which may be networked equipment that can provide for transmission of data. As an example, onsite equipment can be edge enabled equipment that includes local computing capabilities (e.g., hardware, operating systems, etc.).

In the example of FIG. 8, the system 800 can include or interoperate with on-premise components and cloud platform components. As shown, the on-premise agent 810 can be a service that can poll the data source 812 and can push events related to data to one or more cloud platform components. In such an example, the ingestion pipeline 820 can subscribe to various agents, which can include various on-premise agents. In such an approach, the system 800 can determine when changes occur for data associated with a number of agents where such data can be utilized in one or more workflows. Such an approach provides relevant change information to alleviate various types of "chatting" to make use of data by one or more workflows more efficient. In the example of FIG. 8, the table 822 (e.g., bigtable) can be one or more cloud platform resources for storage of data, which can be responsive to indications received by the ingestion pipeline 820 from the on-premise agent 810 as related to the data source 812.

In the example of FIG. 8, the buckets ingestion pipeline 830 can receive certain information from the ingestion pipeline 820. For example, consider receipt of property names for data such as "pressure", "temperature", etc., that have changed and the physical time, which may be a converted time (e.g., universal time coordinated (UTC), etc.). Once the buckets ingestion pipeline 830 receives a message from the ingestion pipeline 820, it can generate a journal structure based on the message, which may be in the form of a bucket where the journal structure, bucket or relevant information can be stored in the cache 832. As explained, the change journal service 840 can operate according to an API (e.g., a RESTful API) to provide for access to the cache 832. In such an approach, an API call can specify information and a response can be generated with respect to what is stored in the cache 832 (e.g., as to whether or not a change or changes have occurred).

In the example of FIG. 8, the change journal service 840 can provide for refreshing a cache of the PWE PDI component 844 in response to receipt of a response to an API call that accesses information in the cache 832. For example, a framework associated cache can be refreshed for purposes of knowing whether or not a change or changes have occurred in data associated with a workflow (e.g., a production operations workflow, etc.).

In the example of FIG. 8, data can be or include time series data, which can be expected to experience changes with respect to time. The system 800 can include various sources of data, which can include on-premise data and cloud data. In the example of FIG. 8, the ingestion pipeline 820 can include various features for detecting changes and communicating relevant change information to the buckets ingestion pipeline 830, which can create appropriate information for caching in the cache 832, which is accessible to the change journal service 840 and ultimately one or more frameworks, applications, etc., that rely on on-premise data and/or cloud data that include time series data.

As an example, the ingestion pipeline 820 can generate a single view of data from multiple sources. As mentioned, a workflow can involve processing data from multiple sources where it can be helpful to know whether data from one or more of the multiple sources has changed. As explained, the buckets ingestion pipeline 830 can process information received from the ingestion pipeline 820 to generate an efficient and accessible data structure or data structures in the cache 832, suitable for use by one or more workflows via one or more instances of the change journal service 840 (e.g., via API calls, etc.).

As explained, the table 822 can include actual data received from the PDMS/PI data source 812 and/or the cloud agent 824. As an example, where the PWE PDI component 844 receives an indication that a change has occurred or changes have occurred, it can instruct a framework, an application, etc., to access the appropriate data from the table 822 (e.g., a cloud resource based storage). As explained, the system 800 can facilitate operation of one or more frameworks, particularly as to knowing when to access data where gaining such knowledge is performed in an efficient, optionally via a relatively straightforward API call via the change journal service 840.

As an example, the PWE PDI component 844 can call on the change journal service 840 according to a predetermined interval (e.g., a 5-minute interval) where, if a change or changes are indicated, the PWE PDI component 844 can call for accessing appropriate data from the table 822. As an example, a notification or push approach may be utilized. For example, consider the cache 832 as including features for automated trigger generation where the change journal service 840 can receive a trigger and inform the PWE PDI component 844 as to a change or changes. In such an example, the PWE PDI component 844 may not operate according to an interval but rather according to triggers issued by the cache 832 or other suitable component. As an example, the PWE PDI component 844 may operate in a pull mode, a push mode or a combined pull and push mode. For example, consider pull at 30-minute intervals where push can occur within a 30 minute interval to result in some action.

As an example, change information may be utilized for one or more purposes. For example, where a change has occurred, computations may be expected such that provisioning of cloud platform-based resources can occur to be ready for performing the computations. As an example, the ingestion pipeline 820 can automatically scale by provisioning resources and the buckets ingestion pipeline 830 can automatically scale by provisioning resources. In such an approach, the system 800 can be flexible and provision resources to accommodate various features as data sources provide data at one or more rates, one or more times, etc.

Figure 9:
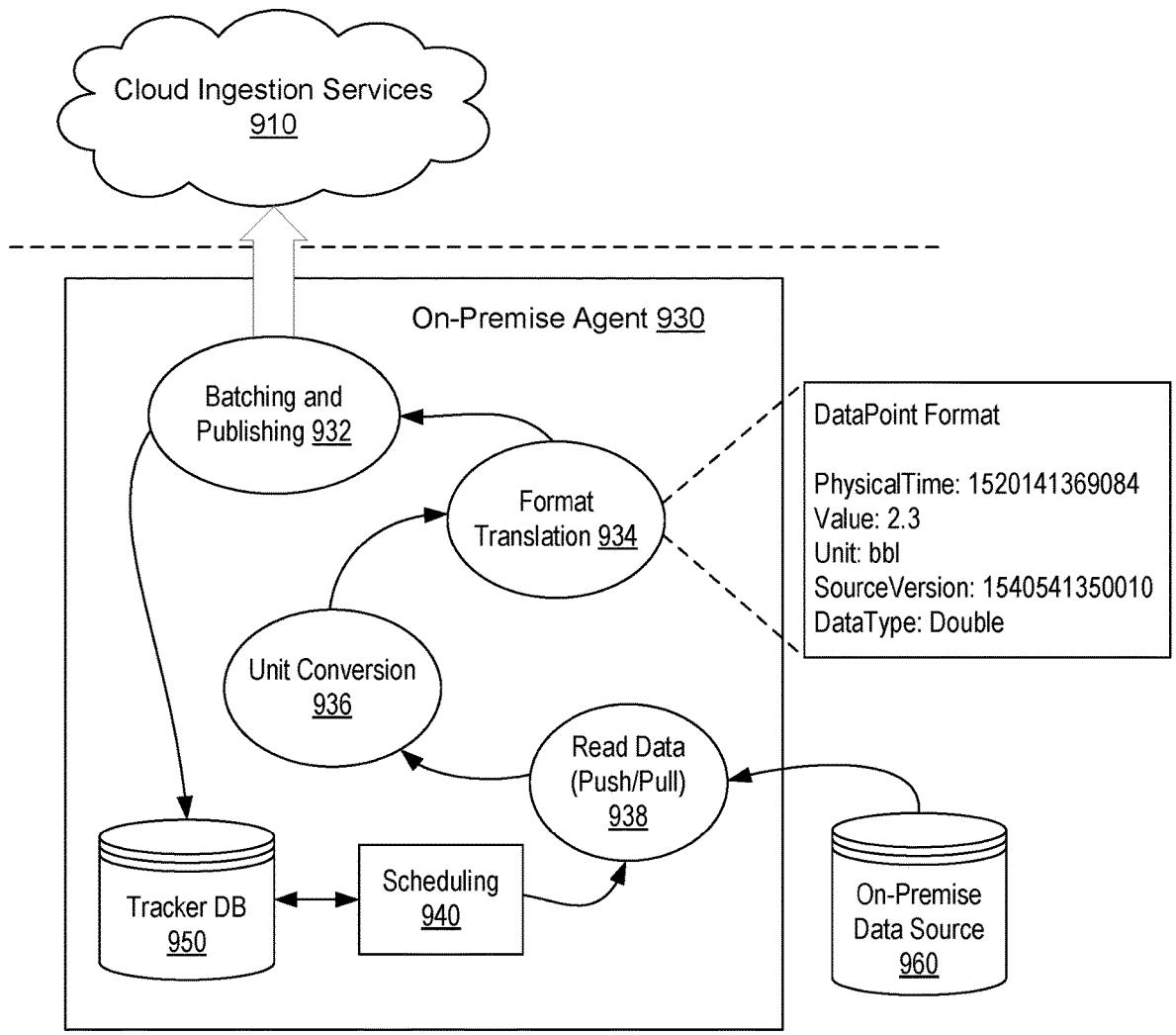
FIG. 9 illustrates an example of a system.

FIG. 9 shows an example of a system 900 that includes cloud ingestion services 910, an on-premise agent 930 and an on-premise data source 960. In the example of FIG. 9, the on-premise agent 930 can include various features for processing data from the on-premise data source 960. For example, consider a batching and publishing component 932, a format translation component 934, a unit conversion component 936, a read data component 938, a scheduling component 940 and a tracker database component 950. As shown, the format translation component 934 can provide for formatting data with a physical time, a value, units (e.g., per the unit conversion component 936), a source version, and a data type. As to the cloud ingestion services 910, these can include one or more features of the ingestion pipeline 820 as in the example of FIG. 8. For example, given information as in the DataPoint Format of the format translation block 934, the ingestion pipeline 820 can discern a change in data from the on-premise data source 960, which may be communicated to the buckets ingestion pipeline 830 for purposes of generating information to be stored to the cache 832, which is accessible via one or more mechanisms.

As an example, various features of the on-premise agent 930 may be present in a cloud agent such as the cloud agent 824 of the example of FIG. 8. For example, the cloud agent 824 may output information according to the example DataPoint format such that the ingestion pipeline 820 can appropriately detect a change or changes.

Figure 10:
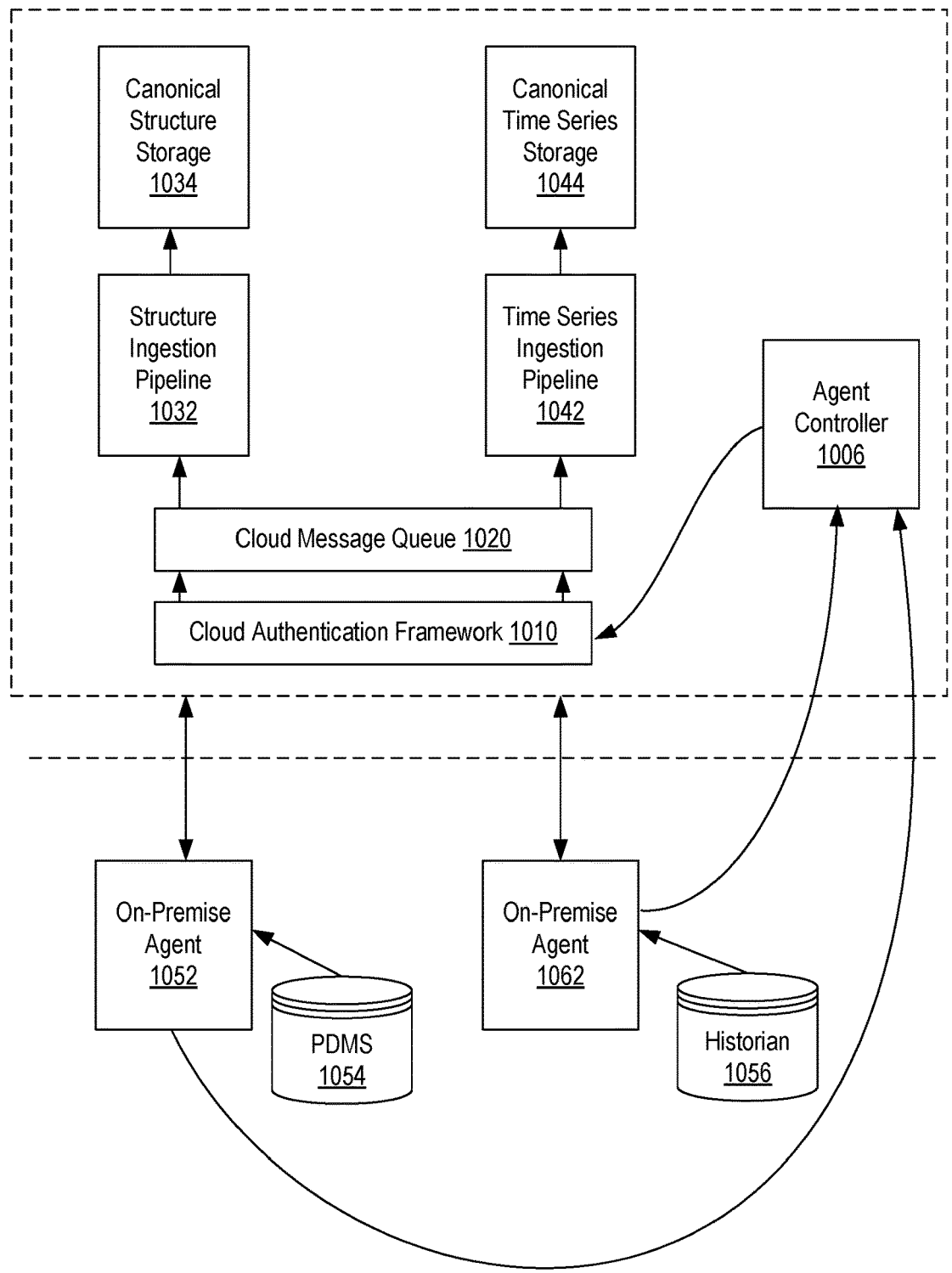
FIG. 10 illustrates an example of a system.

FIG. 10 shows an example of a system 1000 that includes various cloud platform-based features and various on-premise features. For example, the cloud platform-based features can include an agent controller 1006, a cloud authentication framework 1010, a cloud message queue 1020, and two pipelines, one being a structure ingestion pipeline 1032 and the other being a time series ingestion pipeline 1042. As shown, each pipeline can include a storage, specifically a canonical structure storage 1034 and a canonical time series storage 1044.

As to the on-premise features, in the example system 1000, they can include one or more instances of on-premise agents 1052 and 1062, operatively coupled to sources of information such as, for example, a PDMS source 1054 and a historical data source (e.g., a historian, etc.) 1056.

In the example of FIG. 10, operations may be coordinate by the agent controller 1006, which can be a cloud platform-based feature that can operatively couple to the on-premise agents 1052 and 1062.

In the example of FIG. 10, as indicated, multiple pipelines can exist where, for example, a structure pipeline can pertain to structural changes at one or more sites. For example, consider the addition of a sensor that can provide data, which may be time series data. In such an example, the addition of the sensor can be represented as a change for a new source or type of data (e.g., pressure, flow, temperature, etc.). In such an example, a system such as the system 800 of FIG. 8 can provide for tracking changes in data of the new source and/or new type. Such an approach can provide dynamic extensibility for additions of new structure and/or for deletions of existing structure (e.g., taking a sensor offline, etc.).

As an example, structural information can pertain to equipment, assets, etc., at a site. As an example, consider introduction of a new flow meter at a site where a local network at the site may discover the new flow meter and bring it online.

As explained, data can be generated at one or more frequencies, which may be high or low, for example, relative to each other. As an example, a system such as the system 800 can provide for frequency agnostic operation such that it can robustly operate regardless of frequency of a data source or data sources. The system 800 can provide for real-time data delivery with an ability to capture high and low frequency measurement data at low latency in a cloud environment.

In the example of FIG. 8, various heartbeats may be utilized to track activity, health, etc. of equipment, networks, etc. As an example, an on-premise agent can operate close to equipment (e.g., a sensor, etc.) on site such that it may monitor such equipment. As an example, an on-premise agent can acquire logs of equipment, which may include sensor equipment, network equipment, etc. In such an example, loss of local connectivity, status of a sensor, etc., may be communicated to an ingestion pipeline and/or another cloud platform component.

As an example, a system may utilize one or more programming and/or execution platforms. For example, consider .NET (Microsoft Corporation, Redmond, Washington), remote dictionary server (REDIS), JAVA (Oracle Corporation, Santa Clara, California) (e.g., JS, sortedset, etc.), SCALA, AKKA, etc.

SCALA is a statically typed general-purpose programming language which supports both object-oriented programming and functional programming. SCALA source code can be compiled to JAVA bytecode and run on a JAVA virtual machine (JVM). Scala provides language interoperability with JAVA so that libraries written in either language may be referenced directly in SCALA or JAVA code. AKKA is a toolkit for building highly concurrent, distributed, and resilient message-driven applications for JAVA and SCALA. REDIS is an in-memory data structure store, used as a distributed, in-memory key-value database, cache and message broker, with optional durability. REDIS supports different kinds of abstract data structures, such as strings, lists, maps, sets, sorted sets, HyperLogLogs, bitmaps, streams, and spatial indices.

An example of a portion of an API request to get buckets for a day is presented below where, for example, start and end times can be specified using UTC times:

https://localhost:9090/journal/api/v1/buck-
       ets?start=1648497489667 &end=1648583889667 streamIds array shows stream ids (unique identifier in system to identify properties associated with well e.g. oil_production, pressure etc.

minPt, maxPt, aggMinPt, aggMaxPt—used by client of API to make a decision to refresh local cache for time periods—

```
start - minPt, end - maxPt or
start - aggMinPt, end - aggMaxPt
{
    "buckets": [
        {
            "startVersion": 1648497300029,
            "endVersion": 1648497600039,
            "slots": [
                {
                    "index": 10271,
                    "streamIds": [
                        14608
                    ],
                    "minPt": 1648479600000,
                    "maxPt": 1648490400000,
                    "aggMinPt": 1604206800000,
                    "aggMaxPt": 1648490400000
                },
                {
                    "index": 7308,
```

-continued

```
        "streamIds": [
          14569,
          13497
        ],
        "minPt": 1648479600000,
        "maxPt": 1648490400000,
        "aggMinPt": 1540980000000,
        "aggMaxPt": 1648490400000
      },
      {
        "index": 15704,
        "streamIds": [
          14562,
          13463
        ],
        "minPt": 1648479600000,
        "maxPt": 1648490400000,
        "aggMinPt": 1540980000000,
        "aggMaxPt": 1648490400000
      }
    ]
  },
  {
    "startVersion": 1648497600039,
    "endVersion": 1648497900029,
    "slots": [
      {
        "index": 10271,
        "streamIds": [
          14608
        ],
        "minPt": 1648479600000,
        "maxPt": 1648494000000,
        "aggMinPt": 1604206800000,
        "aggMaxPt": 1648494000000
      },
      {
        "index": 7308,
        "streamIds": [
          14569,
          13497
        ],
        "minPt": 1648479600000,
        "maxPt": 1648494000000,
        "aggMinPt": 1540980000000,
        "aggMaxPt": 1648494000000
      },
      {
        "index": 44965,
        "streamIds": [
          13482,
          13464
        ],
        "minPt": 1648479600000,
        "maxPt": 1648494000000,
        "aggMinPt": 0,
        "aggMaxPt": 1648494000000
      },
      {
        "index": 15704,
        "streamIds": [
          14562,
          13463
        ],
        "minPt": 1648479600000,
        "maxPt": 1648494000000,
        "aggMinPt": 1540980000000,
        "aggMaxPt": 1648494000000
      }
    ]
  },
  {
```

As an example, the system 800 may be utilized in one or more environments where time series data are available from multiple sources to be utilized by one or more applications, frameworks, etc. As explained, in the oil and gas production space, operational decisions can be made based on inputs from various field devices, operator inputs and application of analytical methods on data. As an example, the system 800 can make framework workflows more efficient, which can, in turn, improve decision making for one or more purposes (e.g., equipment decision, control decisions, planning decisions, etc.). As an example, the system 800 may be utilized in combination with one or more features of FIG. 1, FIG. 2, FIG. 3 and/or FIG. 4.

A system can provide varying capabilities and scale for independent and isolated storage of raw or calculated production data, model and derived artefacts. As an example, a production engineer with multiple software applications can more readily harness unified capabilities of such a system via ingesting and storing data using a canonical data model.

As explained, a system can provide for secure data ingestion from different data sources through one or more on-premise adaptors (e.g., agents, etc.) and/or one or more cloud agents and store data to the cloud using a bi-temporal canonical data schema that preserves history of data. As explained, a system can enable ingestion of different type of data. For example, consider low frequency asset hierarchy data that may exist on some corporate database or PDMS and high frequency tag-based measurements coming from one or more sources where agents can fetch data from respective data sources and ingest it further to make it accessible to one or more end-user workflows. As explained, a system such as the system 800 of FIG. 8 can help to reduce chattiness between services and help them to scale independently.

As an example, the system 800 of FIG. 8 may be utilized with a framework that aims to help a production engineer focus on high priority wells, to maximize the performance of the asset (e.g., oil production as expected and, potentially, improve the production), to provide diagnosis of a condition accompanied by a recommendation of an action to resolve it via workflows on top of data storage.

As an example, a system may include various features for data type discovery, data quality assessment, etc., which may be integrated into change determinations. For example, if data are new but of poor quality, a change journal may be augmented with a quality indicator (e.g., a quality score, etc.), which can be interpreted by a framework as to whether or not the new data are of sufficient quality for use. If not, then the framework may consider the situation to be the same as a no change situation or, for example, may interpret the quality as being problematic and subject to a service call or other action. As to quality, consider completeness, variance, and/or one or more other data quality metrics.

As an example, the system 800 may be operable in a manner that will not involve human intervention. For example, the system 800 may be automated such that a user will not have to make determinations as to whether or not data have changed, whether or not structure at a site has changed, etc.

The system 800 may be implemented at least in part via a cloud or Platform-as-a-Service (PaaS) non-blocking I/O model, with schedulers, REST endpoints consumption, cloud Identity and access management.

A system such as the system 800 can be implemented in one or more contexts where time series data are generated and optionally where structure change can occur at one or more sites. As explained, such a system can ingest high and low frequency of production data originating from different data sources with assured scalability and readiness to handle big data, cloud level data volume demands.

As explained, a system such as the system 800 can act to harmonize data, which can be through use of agents that direct data to an ingestion pipeline that can make change determinations and issue signals to a change journal component or components, which may utilize a bucket-based approach and a cache accessible via push and/or pull mechanisms. The system 800 can make the process of decision making more streamlined and effective. Such a system can provide for portability, scalability and performance. As explained, various components of the system 800 may be applied to an existing infrastructure to expedite change determinations and consequences thereof.

As an example, a distributed real-time computational framework may include one or more of cloud and on-premises distributed framework components. As an example, a framework can include one or more features of the APACHE SPARK framework, which is capable of handling and distributing computation across multiple nodes and for producing a response in real-time (e.g., near real-time that can be with a latency that can be less than an interval of a data rate or acquisition rate of one or more pieces of equipment, etc., which may be in the field, in a laboratory, etc.).

As an example, a system can include a data quality score computation engine, which may be or may be part of a data assessment engine. For example, consider a microservice that can take mini-batch of defects and/or opportunities and generate one or more types of data metrics (e.g., a six-sigma computation score, etc.).

Figure 11:
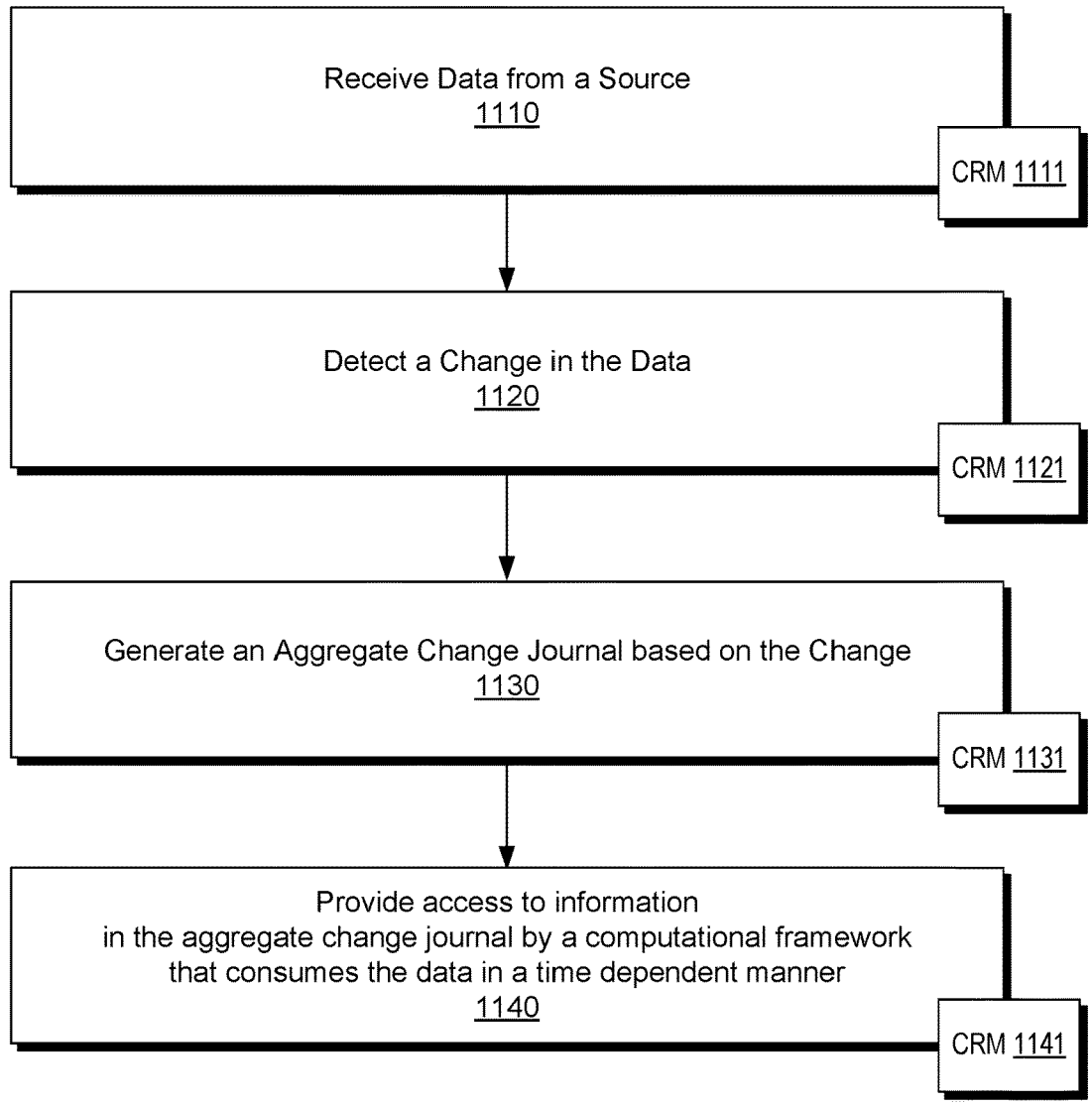
FIG. 11 illustrates an example of a method and an example of a system.
Figure 11:
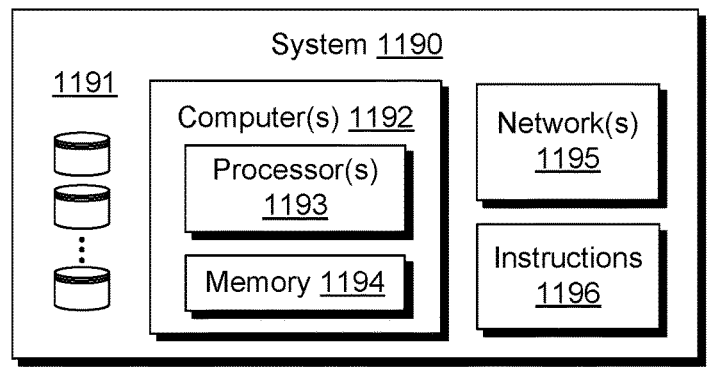

FIG. 11 shows an example of a method 1100 that includes a reception block 1110 for receiving data from a source; a detection block 1120 for detecting a change in the data; a generation block 1130 for generating an aggregate change journal based on the change; and a provision block 1140 for providing access to information in the aggregate change journal by a computational framework that consumes the data in a time dependent manner.

The method 1100 is shown in FIG. 11 in association with various computer-readable media (CRM) blocks 1111, 1121, 1131 and 1141. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1100. As an example, a computer-readable medium (CRM) may be a computer-readable storage medium that is non-transitory and that is not a carrier wave.

In the example of FIG. 11, the system 1190 includes one or more information storage devices 1191, one or more computers 1192, one or more networks 1195 and instructions 1196. As to the one or more computers 1192, each computer may include one or more processors (e.g., or processing cores) 1193 and memory 1194 for storing the instructions 1196, for example, executable by at least one of the one or more processors 1193 (see, e.g., the blocks 1111, 1121, 1131 and 1141). As an example, a computer may include one or more network interfaces (e.g., wired or wireless), one or more graphics cards, a display interface (e.g., wired or wireless), etc.

As an example, a method can include receiving data from a source; detecting a change in the data; generating an aggregate change journal based on the change; and providing access to information in the aggregate change journal by a computational framework that consumes the data in a time dependent manner. In such an example, the method can include storing the information in the aggregate change journal as a data structure to a cache and, for example, providing access to the information provides access to the cache via an application programming interface call. In such an example, the application programming interface call may be issued by or otherwise triggered by the computational framework where, responsive to the change, the computational framework consumes the data. For example, the computational framework may consume data where a change or changes exist. Such a change or changes can be due to one or more reasons. For example, new data can be available that is within a time frame indicated by one or more times in a call (e.g., an API call, etc.). While a pull approach is mentioned, a push or a push and pull approach may be utilized, for example, to trigger action by the computational framework that can include consuming data to generate one or more results.

As an example, data can include field equipment data. As an example, data can include property indicators and timestamps. In such an example, detecting a change can include assessing the property indicators of the data with respect to property indicators of previously received data. As explained, data can be assessed with respect to time where, for example, an API call may specify one or more times.

As an example, providing access to information, which may be in a cache, can occur repeatedly according to a predetermined time interval. In such an example, as time progresses, information in the cache can be updated, revised, etc., for example, with respect to receiving additional information. As an example, a predetermined time interval may be less than approximately 60 minutes, which may depend on source or sources of data, types of data, type of computational framework, etc.

As an example, data can include time series data. As an example, data can include structure data pertaining to equipment at a site. For example, consider structure data that specify one or more types of equipment at a site that may be online or offline, new to the site, removed from the site, etc. In such an example, a piece of equipment may be registered in one or more data stores. For example, in FIG. 8, the structure storage 834 can include information pertaining to structure at a site or sites. In such an example, data from a sensor may be associated with that sensor as present at a site.

As an example, data can include well production time series data and, for example, a computational framework can be a production workflow framework.

As an example, data can include data processed by an agent. In such an example, the agent can include a formatting component that formats the data. As an example, an agent may be an on-premise agent or a cloud agent that can format data suitably for receipt by an ingestion pipeline, which may provide for detection of one or more changes using formatted data.

As an example, an aggregate change journal can include buckets. In such an example, the buckets may include slots.

As an example, information in a change journal can include a summary of at least one change. In such an example, the information may be stored or otherwise represented in a cache that may store information for a period of time, etc. As an example, a cache may be managed according to one or more criteria, which can include time criteria, for example, based on times of data for which a change or changes have been detected.

As an example, a system can include a processor; memory accessible to the processor; and processor-executable instructions stored in the memory to instruct the system to: receive data from a source; detect a change in the data; generate an aggregate change journal based on the change; and provide access to information in the aggregate change journal by a computational framework that consumes the data in a time dependent manner.

As an example, one or more computer-readable storage media can include processor-executable instructions to instruct a computing system to: receive data from a source; detect a change in the data; generate an aggregate change journal based on the change; and provide access to information in the aggregate change journal by a computational framework that consumes the data in a time dependent manner.

As an example, a computer program product can include one or more computer-readable storage media that can include processor-executable instructions to instruct a computing system to perform one or more methods and/or one or more portions of a method.

Figure 12:
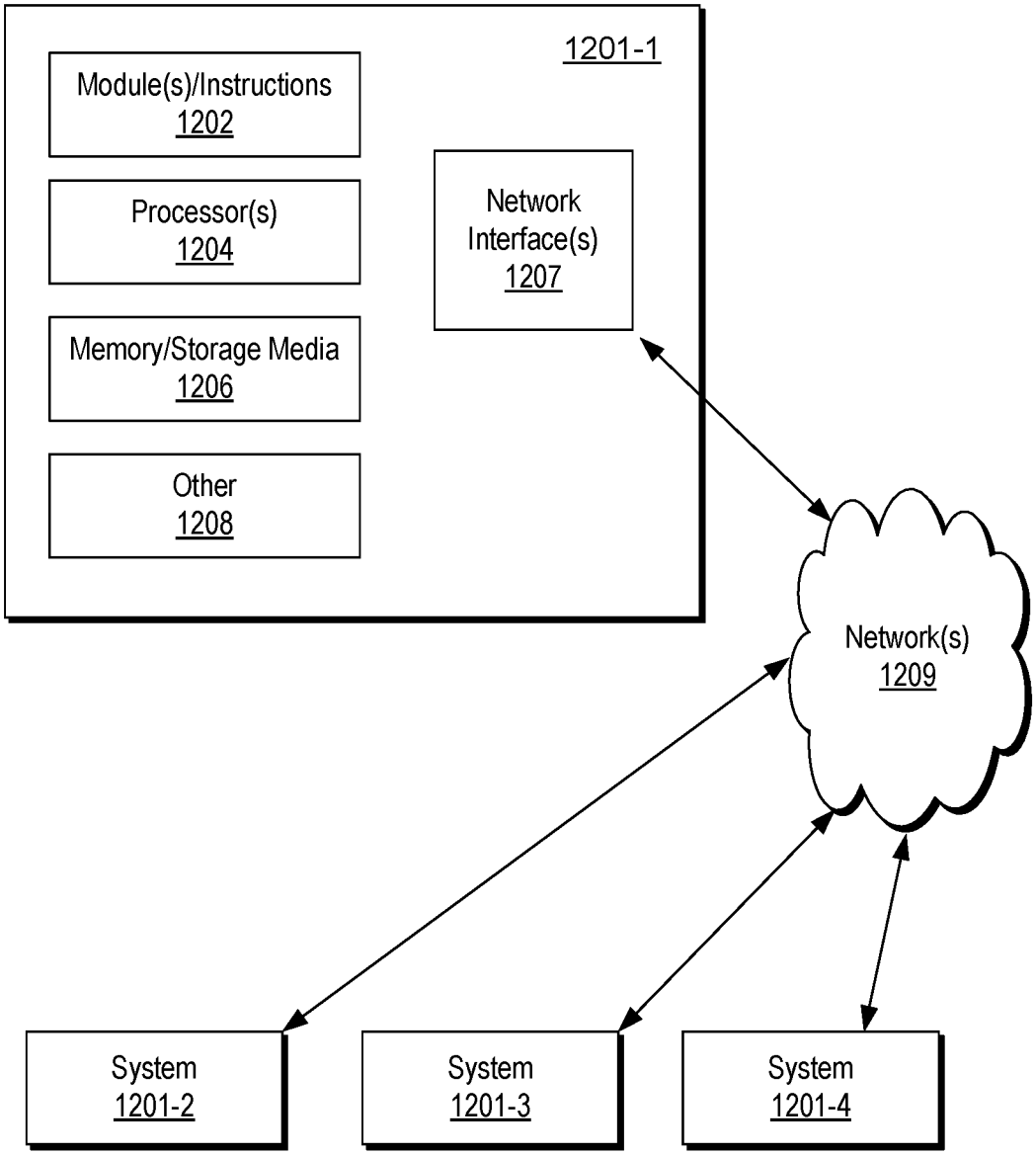
FIG. 12 illustrates examples of computer and network equipment.

In some embodiments, a method or methods may be executed by a computing system. FIG. 12 shows an example of a system 1200 that can include one or more computing systems 1201-1, 1201-2, 1201-3 and 1201-4, which may be operatively coupled via one or more networks 1209, which may include wired and/or wireless networks.

As an example, a system can include an individual computer system or an arrangement of distributed computer systems. In the example of FIG. 12, the computer system 1201-1 can include one or more modules 1202, which may be or include processor-executable instructions, for example, executable to perform various tasks (e.g., receiving information, requesting information, processing information, simulation, outputting information, etc.).

As an example, a module may be executed independently, or in coordination with, one or more processors 1204, which is (or are) operatively coupled to one or more storage media 1206 (e.g., via wire, wirelessly, etc.). As an example, one or more of the one or more processors 1204 can be operatively coupled to at least one of one or more network interface 1207. In such an example, the computer system 1201-1 can transmit and/or receive information, for example, via the one or more networks 1209 (e.g., consider one or more of the Internet, a private network, a cellular network, a satellite network, etc.).

As an example, the computer system 1201-1 may receive from and/or transmit information to one or more other devices 1208, which may be or include, for example, one or more of the computer systems 1201-2, etc. A device may be located in a physical location that differs from that of the computer system 1201-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1206 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general-purpose processors or application specific chips (e.g., or chipsets), such as ASICs, FPGAs, PLDs, or other appropriate devices.

Figure 13:
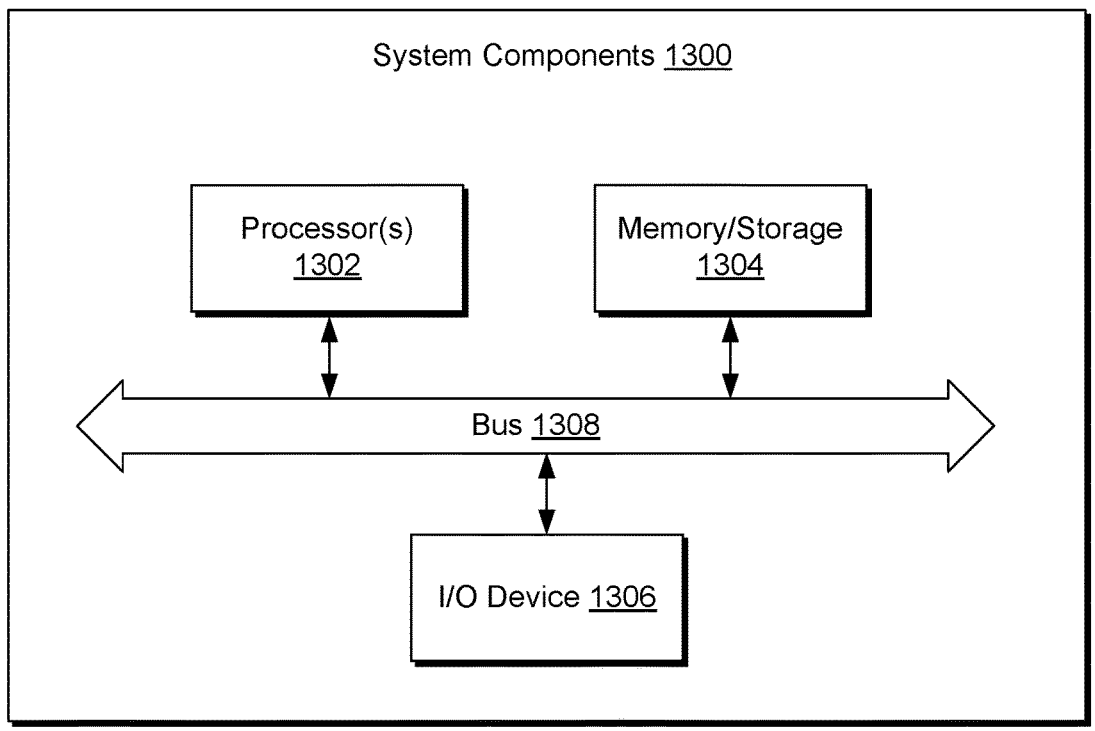
FIG. 13 illustrates example components of a system and a networked system.
Figure 13:
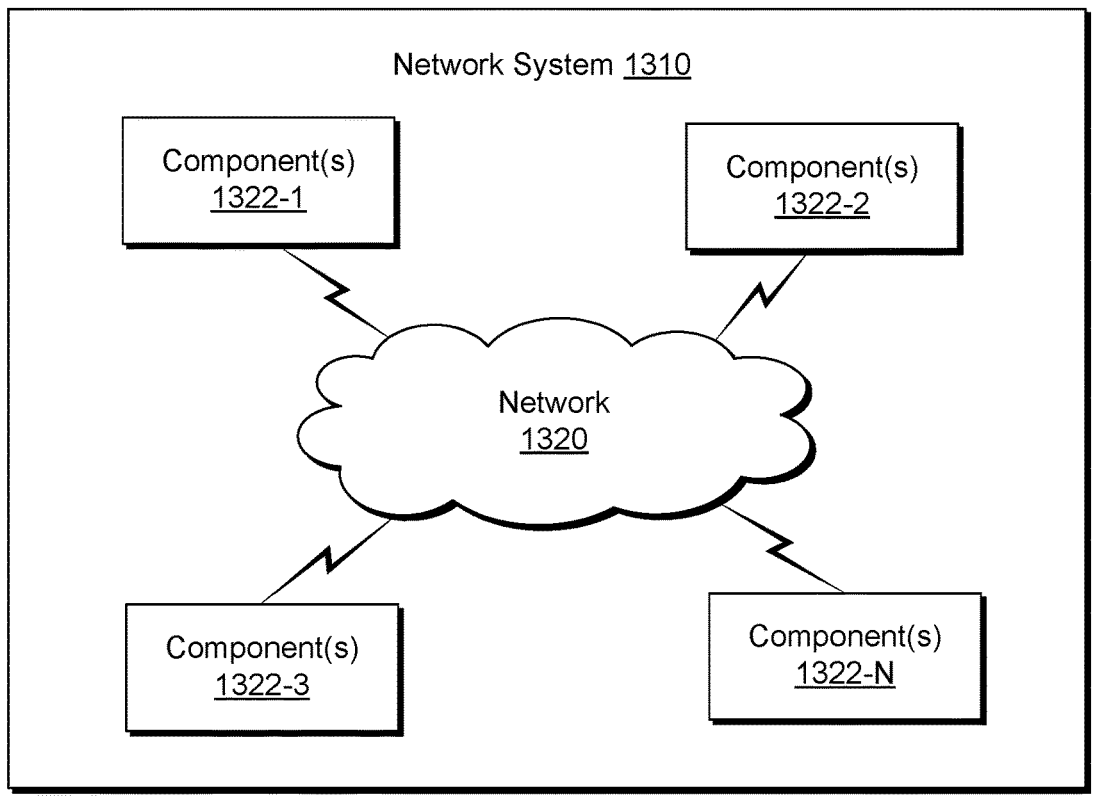

FIG. 13 shows components of an example of a computing system 1300 and an example of a networked system 1310 with a network 1320. The system 1300 includes one or more processors 1302, memory and/or storage components 1304, one or more input and/or output devices 1306 and a bus 1308. In an example embodiment, instructions may be stored in one or more computer-readable media (e.g., memory/storage components 1304). Such instructions may be read by one or more processors (e.g., the processor(s) 1302) via a communication bus (e.g., the bus 1308), which may be wired or wireless. The one or more processors may execute such instructions to implement (wholly or in part) one or more attributes (e.g., as part of a method). A user may view output from and interact with a process via an I/O device (e.g., the device 1306). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1310. The network system 1310 includes components 1322-1, 1322-2, 1322-3, . . . 1322-N. For example, the components 1322-1 may include the processor(s) 1302 while the component(s) 1322-3 may include memory accessible by the processor(s) 1302. Further, the component(s) 1322-2 may include an I/O device for display and optionally interaction with a method. The network 1320 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
   receiving by a cloud resource platform, a first portion of time series data from a source;
   receiving by the cloud resource platform, a second portion of time series data from a source;
   using the cloud resource platform, detecting a change between the first portion and the second portion of the time series data;
   using the cloud resource platform, generating an aggregate change journal based on the change;
   storing information in the aggregate change journal as a data structure to a cache of the cloud resource platform;
   responsive to receipt of an application programming interface call issued by a computational framework or responsive to a notification service that notifies the computational framework, providing access to the information in the cache of the cloud resource platform, wherein the information comprises oldest physical times, and wherein the computational framework is operatively coupled to a local cache of time series data; and
   for a given physical time range specified by a first time and a second time, allowing use of the local cache of time series data by the computational framework, where the minimum of the oldest physical times is not less than the second time.

2. The method of claim 1, wherein the time series data comprise field equipment data.

3. The method of claim 1, wherein the time series data comprise property indicators and timestamps.

4. The method of claim 3, wherein detecting the change comprises assessing the property indicators of the second portion of time series data with respect to property indicators of previously received time series data.

5. The method of claim 1, wherein providing access to the information occurs repeatedly according to a predetermined time interval.

6. The method of claim 5, wherein the predetermined time interval is less than approximately 60 minutes.

7. The method of claim 1, wherein the time series data comprise structure data pertaining to equipment at a site.

8. The method of claim 1, wherein the time series data comprise well production time series data.

9. The method of claim 8, wherein the computational framework comprises a production workflow framework.

10. The method of claim 1, comprising processing the first and second portions of the time series data by an agent.

11. The method of claim 10, wherein the agent comprises a formatting component that formats the first and second portions of the time series data.

12. The method of claim 10, comprising storing the processed first and second portions of the time series data to the cloud resource platform.

13. The method of claim 1, wherein the aggregate change journal comprises buckets.

14. The method of claim 13, wherein the buckets comprise slots.

15. The method of claim 1, wherein the information comprises a summary of at least the change.

16. The method of claim 1, wherein the local cache of time series data comprises at least time series data previously acquired, directly or indirectly, from the source.

17. The method of claim 16, wherein the time series data previously acquired are acquired indirectly from the cloud resource platform.

18. A system comprising:
   a processor;
   memory accessible to the processor; and
   processor-executable instructions stored in the memory to instruct the system to:
      receive a first portion of time series data from a source;
      receive a second portion of time series data from a source;
      detect a change between the first portion and the second portion of the time series data;
      generate an aggregate change journal based on the change;
      store information in the aggregate change journal as a data structure to a cache;
      responsive to receipt of an application programming interface call issued by a computational framework or responsive to a notification service that notifies the computational framework, provide access to the information in the cache, wherein the information comprises oldest physical times, and wherein the computational framework is operatively coupled to a local cache of time series data; and
      for a given physical time range specified by a first time and a second time, allow use of the local cache of time series data by the computational framework, where the minimum of the oldest physical times is not less than the second time.

19. One or more computer-readable storage media comprising processor-executable instructions to instruct a computing system to:
   receive a first portion of time series data from a source;
   receive a second portion of time series data from a source;
   detect a change between the first portion and the second portion of the time series data;

generate an aggregate change journal based on the change;

store information in the aggregate change journal as a data structure to a cache;

responsive to receipt of an application programming interface call issued by a computational framework or responsive to a notification service that notifies the computational framework, provide access to the information in the cache, wherein the information comprises oldest physical times, and wherein the computational framework is operatively coupled to a local cache of time series data; and for a given physical time range specified by a first time and a second time, allow use of the local cache of time series data by the computational framework, where the minimum of the oldest physical times is not less than the second time.

* * * * *